(12) United States Patent
MacDonald et al.

(10) Patent No.: US 11,384,639 B2
(45) Date of Patent: Jul. 12, 2022

(54) ENGINE WITH AT LEAST ONE OF NON-SINUSOIDAL MOTION AND EMBEDDED PISTONS

(71) Applicant: University of Ontario Institute of Technology, Oshawa (CA)

(72) Inventors: Brendan David MacDonald, Toronto (CA); Matthew Lester Murray Dudman, Fenelon Falls (CA); Salvatore Ranieri, Nobleton (CA)

(73) Assignee: University of Ontario Institute of Technology, Oshawa (CA)

(*) Notice: Subject to any disclaimer, the term of this patent is extended or adjusted under 35 U.S.C. 154(b) by 0 days.

(21) Appl. No.: 16/645,099

(22) PCT Filed: Sep. 7, 2018

(86) PCT No.: PCT/CA2018/051088
§ 371 (c)(1),
(2) Date: Mar. 6, 2020

(87) PCT Pub. No.: WO2019/046951
PCT Pub. Date: Mar. 14, 2019

(65) Prior Publication Data
US 2020/0291778 A1 Sep. 17, 2020

Related U.S. Application Data
(60) Provisional application No. 62/555,832, filed on Sep. 8, 2017.

(51) Int. Cl.
*F02B 75/04* (2006.01)
*F01B 7/20* (2006.01)
(Continued)

(52) U.S. Cl.
CPC .......... *F01B 7/20* (2013.01); *F01B 9/02* (2013.01); *F01B 9/06* (2013.01); *F16H 21/28* (2013.01); *F16H 21/36* (2013.01); *F02B 75/32* (2013.01)

(58) Field of Classification Search
CPC ...... F02B 75/28; F02B 75/285; F02B 75/287; F02B 75/30
(Continued)

(56) References Cited

U.S. PATENT DOCUMENTS 4,996,953 A 3/1991 Buck
5,406,911 A 4/1995 Hefley
(Continued)

FOREIGN PATENT DOCUMENTS

FR 2909131 A1 5/2008
WO 2018/162876 A1 9/2018

OTHER PUBLICATIONS

International Search Report and Written Opinion dated Nov. 23, 2018 in International Patent Application No. PCT/CA2018/051088 (12 pages).
(Continued)

*Primary Examiner* — John Kwon
(74) *Attorney, Agent, or Firm* — Bereskin & Parr LLP/S.E.N.C.R.L., s.r.l.; Tony Orsi

(57) ABSTRACT

Various embodiments are described herein for methods and devices that relate to a drive mechanism, and a power mechanism that can be used 5 individually or together in an engine to obtain increased efficiency are provided according to the teachings herein. The embodiments described herein generally employ at least one of drive mechanisms that provide for non-sinusoidal motion and embedded piston arrangements.

22 Claims, 17 Drawing Sheets

(51) Int. Cl.
*F01B 9/02* (2006.01)
*F16H 21/28* (2006.01)
*F16H 21/36* (2006.01)
*F01B 9/06* (2006.01)
*F02B 75/32* (2006.01)

(58) Field of Classification Search
USPC ........ 123/48 B, 48 C, 50 R, 50 A, 52.2, 52.3
See application file for complete search history.

(56) References Cited

U.S. PATENT DOCUMENTS

| | | |
|---|---|---|
| 6,701,709 B2 | 3/2004 | Isaac, Jr. et al. |
| 7,011,052 B2 | 3/2006 | Dow |
| 7,117,827 B1 * | 10/2006 | Hinderks ................ F02B 75/00 |
| | | 123/43 R |
| 7,438,027 B1 * | 10/2008 | Hinderks .................. F01L 1/18 |
| | | 123/43 R |
| 2008/0125266 A1 * | 5/2008 | Pohl ........................ F16H 35/02 |
| | | 475/17 |
| 2008/0141921 A1 * | 6/2008 | Hinderks ............... B63H 21/14 |
| | | 114/274 |
| 2012/0227389 A1 * | 9/2012 | Hinderks ................ F01L 1/146 |
| | | 60/317 |

OTHER PUBLICATIONS

Cheng et al., "Dynamic simulation of a beta-type Stirling engine with cam-drive mechanism via the combination of the thermodynamic and dynamic models", Renewable Energy, 2011, 36: 714-725.

* cited by examiner

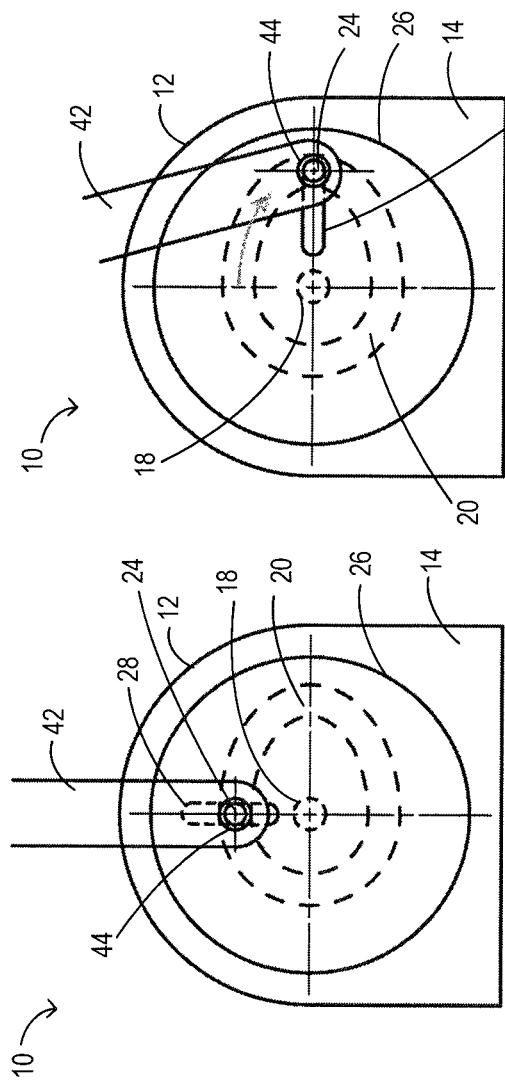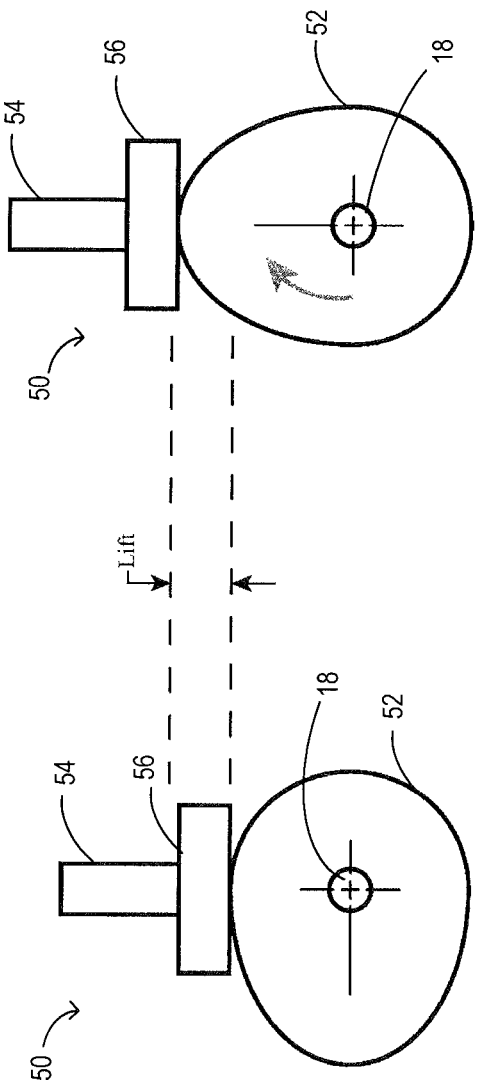

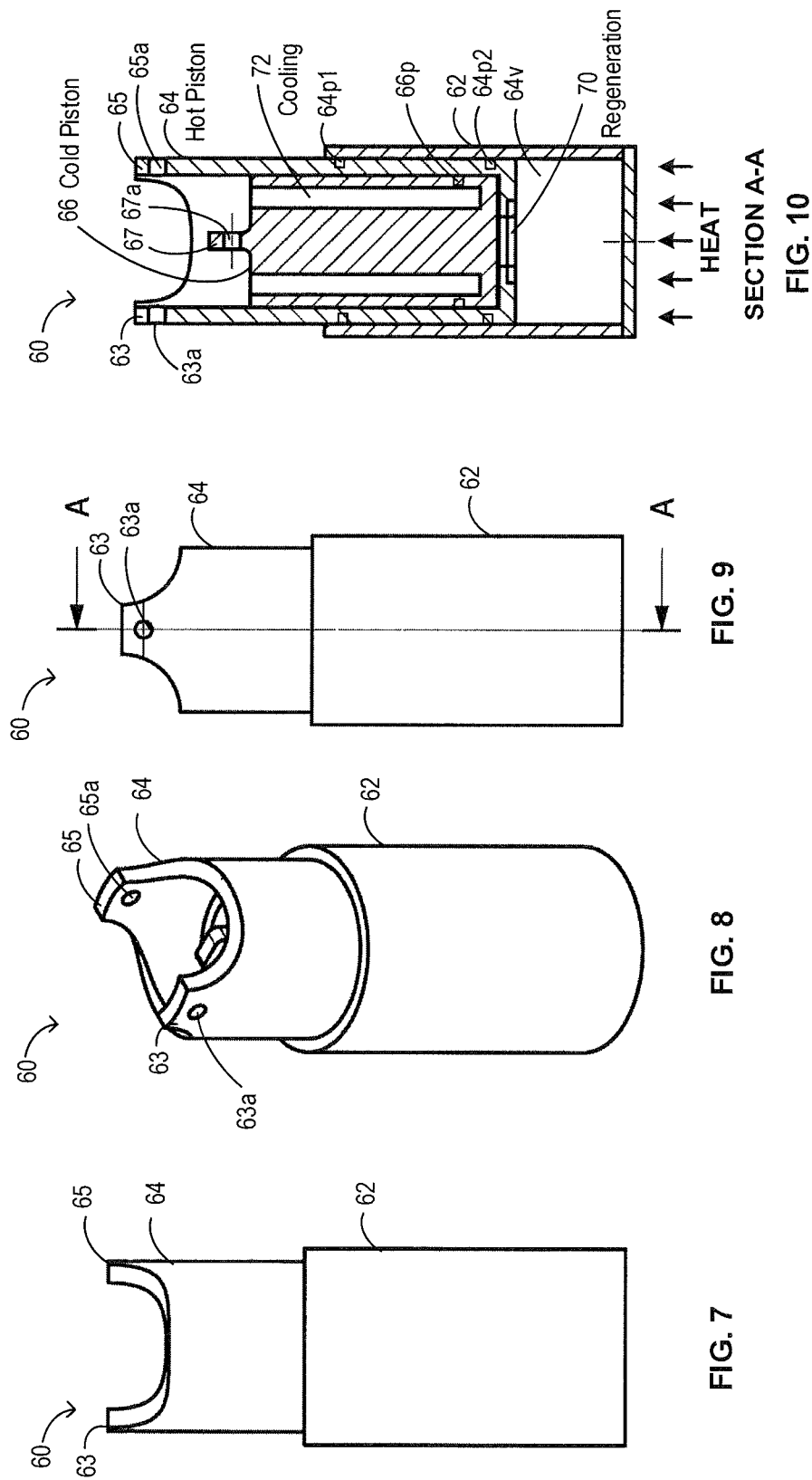

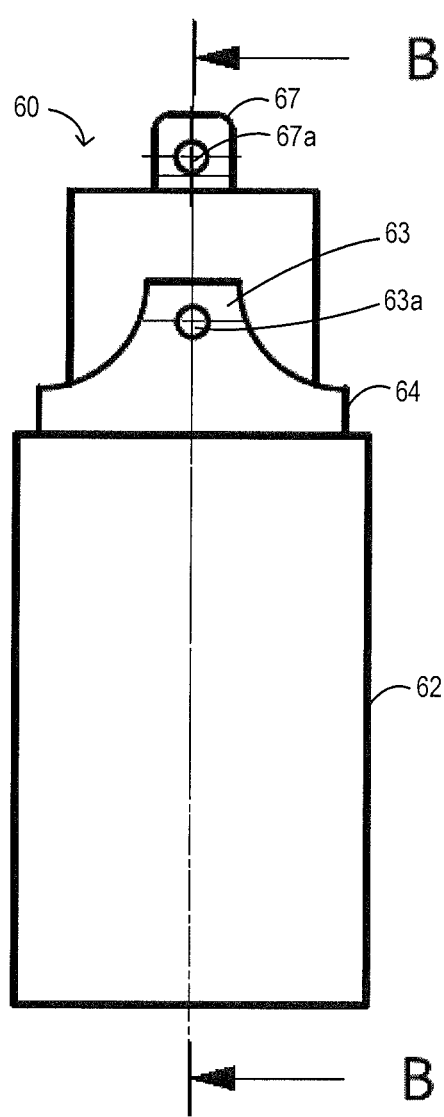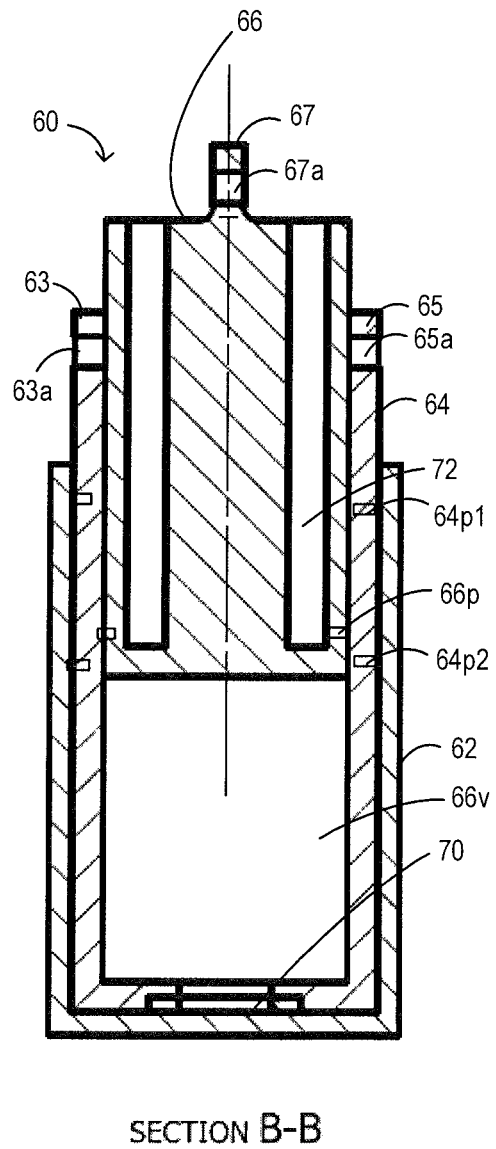
FIG. 11A
FIG. 11B

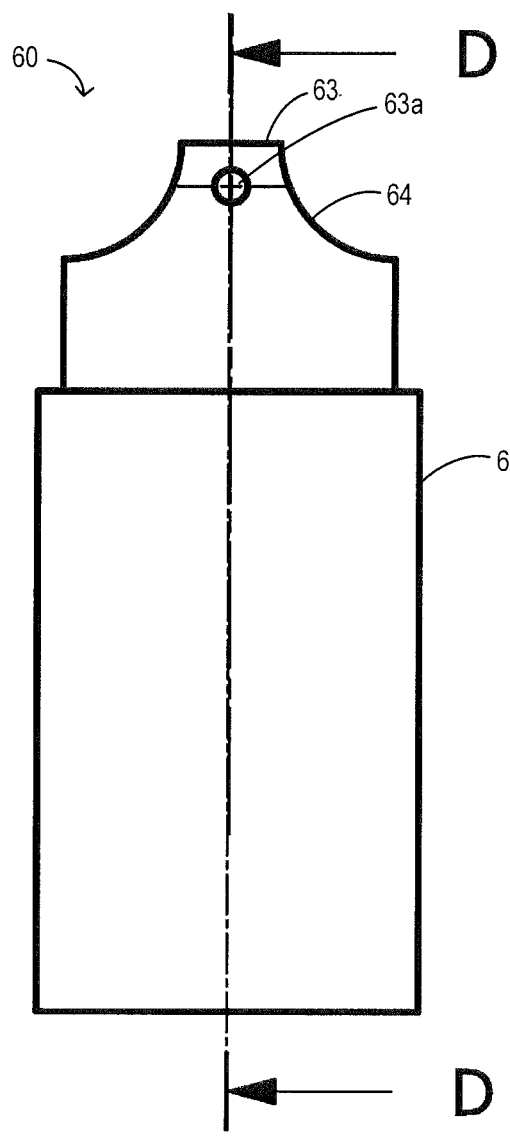
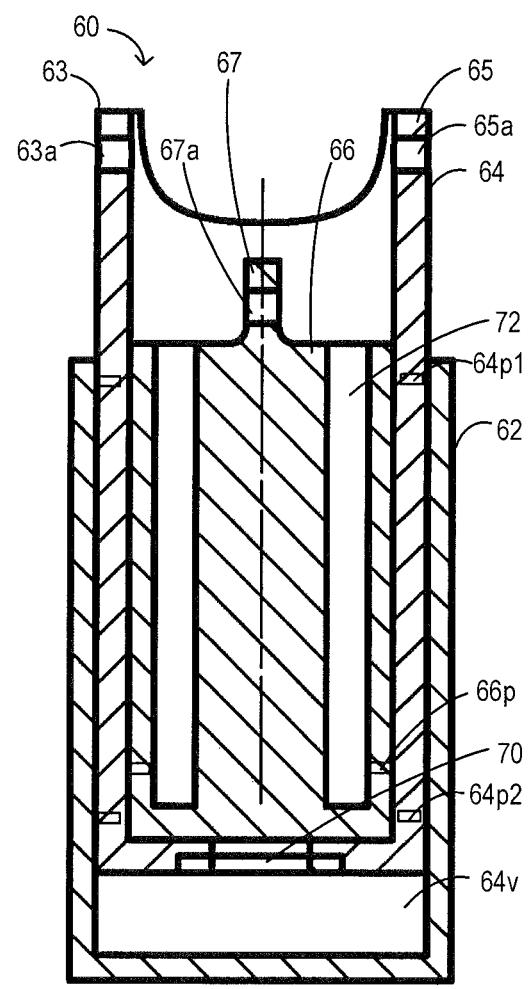
FIG. 13A                    FIG. 13B

ENGINE WITH AT LEAST ONE OF NON-SINUSOIDAL MOTION AND EMBEDDED PISTONS

CROSS-REFERENCE

This application is a 35 USC § 371 national stage entry of International Patent Application No. PCT/CA2018/051088, filed Sep. 7, 2018, which claims the benefit of U.S. Provisional Patent Application No. 62/555,832, filed Sep. 8, 2017, and entitled "ENGINE WITH AT LEAST ONE OF NON-SINUSOIDAL MOTION AND EMBEDDED PISTONS"; the entire contents of each of which are hereby incorporated by reference.

FIELD

Various embodiments are described herein that relate to a drive mechanism, and a power mechanism that can be used individually or together in an engine to obtain increased efficiency.

BACKGROUND

Drive mechanisms, commonly referred to as crank shafts or cranking mechanisms, offer a simple yet robust method of translating linear constrained motion to rotational motion about a perpendicular axis. Crank shafts are used as a mechanical linkage in almost all piston reciprocating engines in which shaft work is the desired outcome. Crank shafts can be made for a wide variety of engine configurations and piston layouts such as inline, v-shaped, and w-shaped piston banks. Crank shafts are typically independent of thermodynamic cycles and are able to operate for an extremely wide variety of shapes and sizes of engines, from small chainsaw engines to large cruise ship engines.

Crank shafts typically consist of several features including a forged or casted main body structure, concentric journal bearings, eccentric connecting rod bearings, counter balances, and oil channels. The crank shaft is typically assembled and constrained to the bottom of an engine block by its concentric journal bearings. The connecting rod linkages are then able to constrain the pistons to the crank while the bottom of the engine block is still exposed. Once the connections are made, the engine block is sealed, often with an oil pan, to allow the metallic interfaces to be exposed to lubrication. This ensures that the moving bearings and linkages can operate reliably for continuous use.

In addition to converting linear motion into rotational motion, the crank shaft is responsible for the displacement of the piston. The volumetric displacement impacts the operation of the engine as it defines important compression and expansion characteristics for the engine cycle. In particular, the volumetric ratio may influence the compression ratio, which is often related to the thermal efficiency of an engine. The crank shaft is designed so that the eccentric location aims to accomplish the thermodynamic requirements as well as the desired kinematic characteristics.

The piston assemblies, which may be referred to as power mechanisms, work in unison with the crank shaft to produce a work output. A piston is located within its respective cylinder and provides a seal and a moving boundary to define a variable volume chamber. In particular, the piston is typically made of metal, such as aluminum, and is conventionally designed to take the shape of the inner cylinder wall to seal the working fluid so that it remains above the piston in the corresponding chamber. The working fluid may expand and contract due to heat input and heat output. As the working fluid expands and contracts, the piston moves in the cylinder in a linear fashion. The position of the piston changes the volumetric relationship of its respective cylinder making it possible to input work (in the form of compression) and extract work (in the form of expansion) to produce a working cycle. The linear motion of the piston assembly is transformed into rotational motion by the crank shaft or drive mechanism.

To perform ideal thermodynamic engine cycles, a heat source and a heat sink are established and a series of energetic steps take place in a specific order to achieve isothermal and adiabatic heat addition and rejection in order to enable the possibility of work extraction. However, due to many real world factors, such as material and conventional assembly constraints, it is very difficult to achieve ideal adiabatic and isothermal processes (i.e. the Carnot cycle), which hinders the maximum attainable net work extraction and thermal efficiency of the engine.

There is always merit in increasing the thermal efficiency of an engine for many environmental and operational budgetary reasons. For example, many conventional internal combustion (IC) engines operate using hydrocarbons. Nitrogen and sulfur oxides are also present in the combustion process, which produces harmful greenhouse gases.

External combustion (EC) engines may also use conventional fossil fuel sources, but they are burned more efficiently than in an IC engine. Furthermore, EC engines provide a more sustainable form of energy production over IC engines since in an EC engine the heat is provided on the outside of the cylinders, which allows for alternative fuel sources to be used. For example, the EC engine can use alternative fuel sources such as the sun, waste heat from factories, burning biomass and agriculture waste, and other fuel sources of this nature.

This is advantageous as there is currently a high demand for reliable and sustainable sources of energy to tackle the increasing threat of global climate change. For example, it is becoming increasingly popular for individuals and communities, particularly in remote settings but expanding to other settings as well, to have small-scale generation of heat and electric power as an alternative to centralized grid power, which is termed "microgeneration". This microgeneration is often motivated by practical considerations, such as an inability to access a reliable power source, but has the benefit of being capable of using sustainable sources, such as solar and wind power. Diesel generators can also be used but they contribute to $CO_2$ emissions and transporting diesel fuel to remote or emergency settings can be difficult. While wind turbines and solar photovoltaic panels offer sustainable solutions, both the wind and sun are intermittent and unpredictable energy sources, thus limiting the applicability of these technologies, particularly in remote or emergency settings that lack backup power.

EC engines can provide sustainable solutions and have more flexibility in their energy sources to ensure a steady supply of energy. EC engines are also capable of operating at the maximum obtainable efficiency for thermodynamic cycles (i.e. Carnot efficiency). For example, the Stirling and Ericsson cycles are two external heat engine cycles that are theoretically capable of obtaining the maximum (Carnot) efficiency. However, in practice, they are operated with two separate pistons, the hot and cold pistons, which move in continuous harmonic sinusoidal motion by either (i) a physical connection to a crank shaft, or (ii) a "linear free piston" arrangement where one piston oscillates resonantly. Since the theoretical Stirling and Ericsson cycles require dwell periods, where the working fluid is restricted to only the hot or cold pistons, the engines that use continuous harmonic sinusoidal motion can only approximate the true cycles. This approximation results in a substantial loss in both power output and efficiency for even the most efficient EC engines.

SUMMARY OF VARIOUS EMBODIMENTS

Various embodiments of methods and devices that relate to a drive mechanism, and a power mechanism that can be used individually or together in an engine to obtain increased efficiency are provided according to the teachings herein. The embodiments described herein generally employ at least one of drive mechanisms that provide for non-sinusoidal motion and embedded piston arrangements.

In one broad aspect, at least one embodiment described herein provides a drive mechanism comprising: a support having an axis of rotation and a cam that is disposed about the axis of rotation and is non-circular; an output shaft rotatably coupled to the axis of rotation; and a cam follower slidingly engageable with the cam and connectable to a drive input, wherein an angular velocity of rotation for the output shaft is based on the cam follower moving about the cam.

In at least one embodiment, the cam comprises a cam lobe that is rotatably coupled to the support, the cam lobe having a non-circular surface that is slidably engaged by the cam follower.

In such embodiments, the cam follower may be an end portion of a connecting rod that is movable in a single degree of freedom.

In such embodiments, the cam lobe is coupled to a piston to drive the piston during use.

In at least one embodiment, the cam may comprise a cam groove that is formed on a first surface of the support and the cam follower comprises a journal bearing pin that engages and slides within the cam groove during use.

In at least one embodiment, the drive mechanism further comprises a torque transfer disk that is adjacent to the surface of the support having the cam groove and rotatably coupled to the cam groove, and the torque transfer disk comprises a torque transfer disk groove that is engaged by the journal bearing pin of the cam follower.

In such embodiments, the torque transfer disk groove may have a first end that is disposed from the axis of rotation by a first amount equal to a minimum distance of the cam groove to the axis of rotation and a second end that is disposed from the axis of rotation by a second amount equal to a maximum distance of the cam groove from the axis of rotation.

In such embodiments, the torque transfer disk and the output shaft are rotatably coupled and rotate together during use.

In at least one embodiment, the drive mechanism may comprise a second support having a second axis of rotation that is coaxial with the axis of rotation of the support; a second cam having a second cam groove on a second surface of the second support; and a second cam follower comprising a second journal bearing pin that engages and slides within the second cam groove during use.

In such embodiments, the drive mechanism may comprise a second torque transfer disk that is adjacent to the second surface of the second support having the second cam groove and rotatably coupled to the second cam groove, and the torque transfer disk comprises a second torque transfer disk groove that is engaged by the second journal bearing pin of the second cam follower.

Alternatively, in at least one embodiment, the drive mechanism may comprise a second cam having a second cam groove on a second surface of the support that is opposite to the first surface; and a second cam follower comprising a second journal bearing pin that engages and slides within the second cam groove during use.

In such embodiments, the drive mechanism may comprise a second torque transfer disk that is adjacent to the second surface of the support having the second cam groove and rotatably coupled to the second cam groove, and the torque transfer disk comprises a second torque transfer disk groove that is engaged by the second journal bearing pin of the second cam follower.

In another broad aspect, at least one embodiment described herein provides a power mechanism comprising: a cylinder having a closed end wall and an open end; a first piston being at least partially disposed within the cylinder, the first piston having an end wall with an aperture that is proximal to the closed end wall of the cylinder and an open end that extends past the open end of the cylinder, the first piston being movable with respect to the cylinder; a second piston being disposed within the first piston and being movable therein, the second piston having a closed end wall that is proximal to the end wall of the first piston and the first piston acting as a cylinder for the second piston; and a shared working fluid that is disposed between the closed end wall of the cylinder and the closed end wall of the second piston; wherein, during use, at least one of the first and second pistons move causing the working fluid to transition between an end wall of the cylinder where the working fluid receives heat input from a heating source and expands and the end wall of the second piston vessel where the working fluid provides heat output to an external cooling source and contracts, thereby providing a net work output.

In at least one embodiment, the power mechanism further comprises a regenerator that is disposed at the aperture of the end wall of the first piston and is adapted for cooling the working fluid when the working fluid moves from the cylinder to the second piston and the regenerator is adapted for heating the working fluid when the working fluid moves from the second piston to the cylinder.

In such embodiments, the regenerator may comprise a porous medium, a random network of wire fibers, a wire mesh, or any passageway that enables heat transfer when the working fluid passes therethrough.

In at least one embodiment, the first and second pistons are moveable according to a desired thermodynamic cycle.

In at least one embodiment, during a phase of the thermodynamic cycle the first piston moves and the second piston is stationary.

In such embodiments, the second piston may be stationary in a fully extended position such that the working fluid causes the first piston to move.

In at least one embodiment, during another phase of the thermodynamic cycle the second piston moves and the first piston is stationary.

In such embodiments, the first piston may be stationary in a fully extended position such that the working fluid causes the second piston to move.

In at least one embodiment, during another phase of the thermodynamic cycle both the first and second pistons move.

In such embodiments, the first and second pistons move according to a non-sinusoidal motion during the thermodynamic cycle.

In at least one embodiment, the second piston has a heat transfer surface capable of thermal communication with the external cooling source.

In such embodiments, the heat transfer surface may comprise an annular cylindrical chamber extending from a closed end wall of the second piston and for receiving a coolant that is capable of being cooled by the external cooling source.

In such embodiments, the heat transfer surface may comprise an external surface of an end wall of the second piston and/or an external circumferential surface of the second piston that extends past the open end wall of the first piston wherein the heat transfer surface is capable of being cooled by the external cooling source.

In another broad aspect, at least one embodiment described herein provides an engine assembly comprising: a drive mechanism defined in accordance with the teachings of any of the drive mechanism embodiments described herein; a power mechanism defined in accordance with the teachings of any of the power mechanism embodiments described herein; a first connecting rod for coupling the first piston of the power mechanism to the cam groove of the drive mechanism; and a second connecting rod for coupling the second piston of the power mechanism to the second cam groove of the drive mechanism.

Other features and advantages of the present application will be apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIGS. 5A and 5B are schematic front views of an example embodiment of a radially variable drive mechanism coupled to a connecting rod that is at two different stages of a cycle.

FIGS. 6A and 6B show front views of an alternative embodiment of a radially variable drive mechanism in first and second positions in the thermodynamic cycle which are 90 degrees out of phase.

FIGS. 7 to 10 show a side view, a perspective view, a front view, and a sectional side view, respectively, of an example embodiment of a power mechanism.

FIGS. 11A and 11B show a front view and a sectional side view, respectively, of the power mechanism of FIGS. 7-10 in a first phase of a thermodynamic cycle (the Stirling cycle).

FIGS. 13A and 13B show a front view and a sectional side view, respectively, of the power mechanism of FIGS. 7-10 in a third phase of the Stirling thermodynamic cycle.

Figure 2:
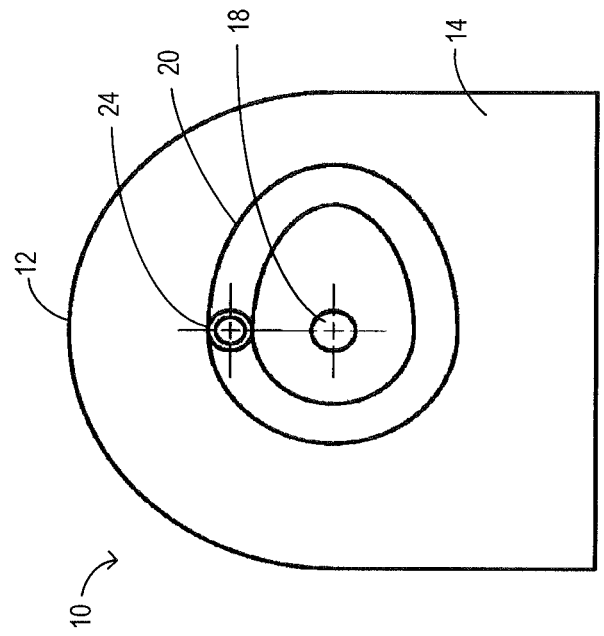
FIGS. 1 to 4 show a front view, a sectional front view, a front perspective view and a rear perspective view, respectively, of an example embodiment of a radially variable drive mechanism in accordance with the teachings herein.
Figure 1:
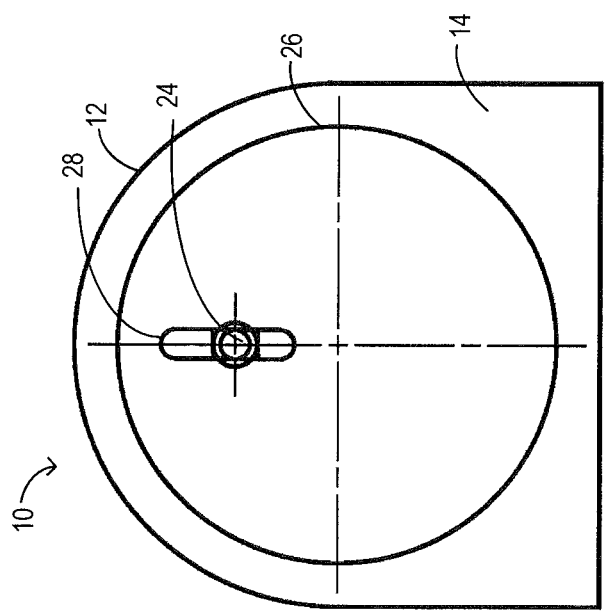
Figure 3:
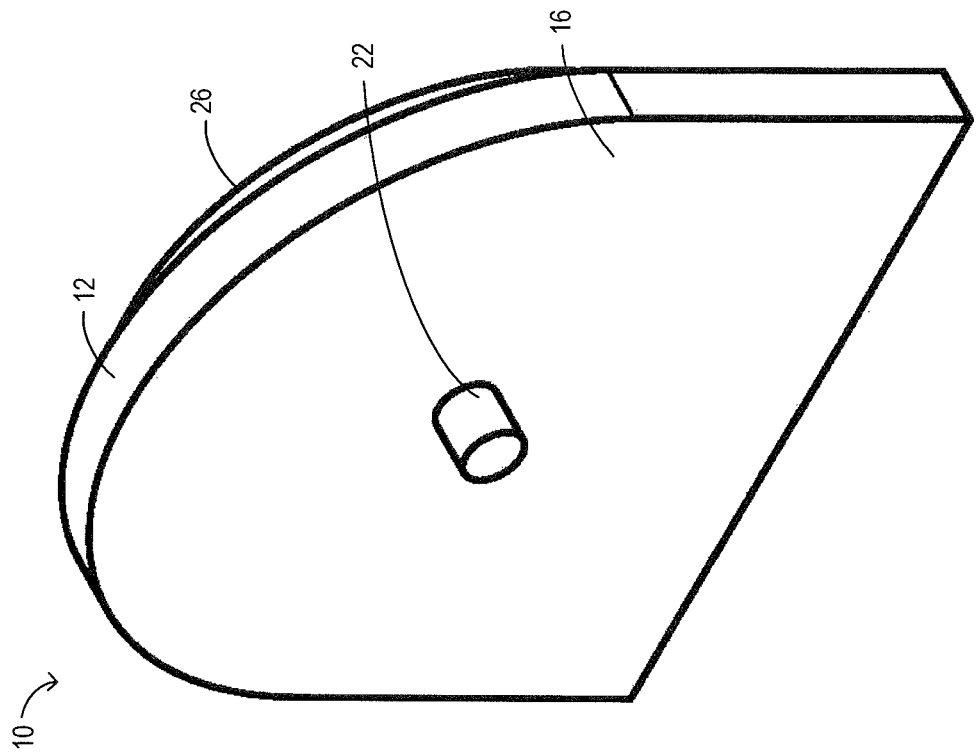
Figure 4:
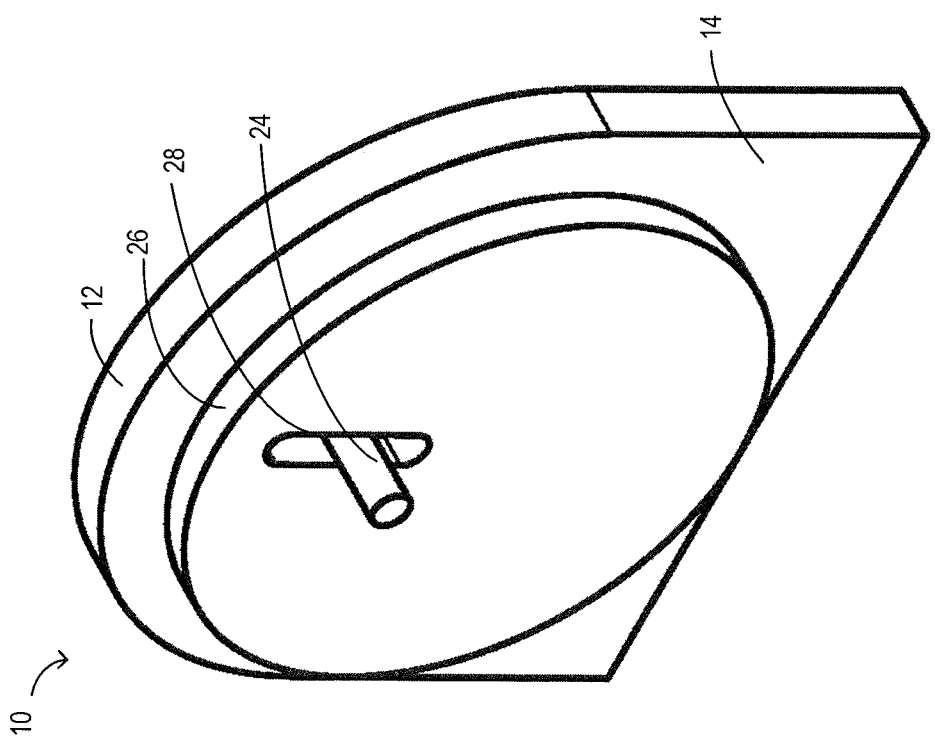

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter: The claimed subject matter is not limited to devices or methods having all of the features of any one of the devices or methods described below or to features common to multiple or all of the devices and or methods described herein. It is possible that there may be a device or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending on the context in which these terms are used. For example, the terms coupled or coupling can have a mechanical connotation. For example, as used herein, the terms coupled or coupling may mean that two elements can be directly connected to one another or connected to one another through at least one intermediate mechanical element or device, depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "similarly", "about" and "approximately" as used herein mean a reasonable amount of deviation of the modified term such that the end result is not significantly changed. These terms of degree may also be construed as including a deviation of the modified term, such as 1%, 2%, 5%, or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as up to 1%, 2%, 5% or 10%, for example.

The majority of engines operate with their working volumes constrained to a crankshaft that spins in a circular fashion, which is defined by pistons that follow a sinusoidal motion. Although using a sinusoidal cycle for the piston motion is kinetically simple to constrain and results in the efficient transmission of torque and power with little mechanical losses, it often does not coincide with the optimal motion according to ideal thermodynamic cycle for engine operation. However, the inventors have realized that deviating from conventional cranking mechanisms and conventional piston configurations/arrangements can lead to engines with improved power and efficiency and a more compact design.

In accordance with the teachings herein, to better emulate an ideal thermodynamic cycle, power mechanisms may be controlled by a cam that does not have the conventional circular shape. Since the shape of the cam determines the cycle of the pistons in the power mechanism, altering the profile of the cam will alter the cycle of the pistons which will alter the thermodynamic cycle of an engine that uses such cams since the cams may be coupled to, or disposed on, drive mechanisms that connect to the power mechanism of an engine.

In accordance with an aspect of the teachings herein, at least one embodiment is provided herein for a drive mechanism that can be used to drive a piston in a non-sinusoidal manner such that it follows a non-sinusoidal cycle. This is advantageous since a sinusoidal motion/cycle does not offer the best solution to harness all of the potential work that an engine process may have to offer. In accordance with an aspect of the teachings herein, a cam, which can be a cam lobe or a cam groove, has a non-circular shape that can be used to provide a non-sinusoidal driving force onto another element, such as a crank shaft or a piston.

The use of cams that have a non-circular shape allows for greater control over the piston motion in contrast to the standard sinusoidal motion (i.e. circular motion). For example, with a non-circular cam it is possible to dwell or slow the pistons' trajectory and deviate from sinusoidal movement which allows for the associated thermodynamic cycle to follow the ideal thermodynamic cycle more closely (which results in a more efficient and powerful engine) which is in contrast to the traditional sinusoidal motion which often does not coincide with the optimal motion for a piston. The dwell in the piston motion can be accomplished by shaping the cam such that the linear position of the piston remains in the same location even as the motion of the cam follower continues. The ability to closely resemble the theoretical thermodynamic cycles provides a way to realize the high theoretical efficiencies from ideal thermodynamic cycles, such as the Stirling and Ericsson cycles.

Referring now to FIGS. 1 to 4, illustrated therein is a radially variable drive mechanism 10, which may be a portion of a crank shaft assembly. However, it should be understood that in other embodiments, the drive mechanism 10 may be used with another mechanical assembly. The drive mechanism 10 is, configured to provide a non-circular motion to increase the efficiency of an engine that uses the drive mechanism. It should be known that the associated terminology and the mechanical arrangement provided herein are done so for ease of illustration and are not intended as a full scale kinematic solution.

The drive mechanism 10 generally comprises a first support 12 having a first surface 14 and a second surface 16 and a cam 20 that is disposed about the axis of rotation which is represented by the aperture 18. In this example, the aperture 18 extends through the support 12 from the first surface 14 to the second surface 16; however, this may not be the case in other embodiments. The cam 20 has a non-circular shape (see FIG. 2). In this example embodiment, the cam profile is stationary but it may move in other embodiments by using a cam lobe, for example as is shown in FIGS. 6A-6B. The drive mechanism 10 also comprises an output shaft 22 that may extend fully, or at least partially, into the aperture 18. The output shaft 22 may be rotatable in the aperture 18. An angular velocity of rotation for the output shaft 22 is based on the cam follower moving about the cam 20. However, in alternative embodiments, the output shaft 22 may be coupled in other ways to the cam 20.

In this example embodiment, the drive mechanism 10 also comprises a torque transfer disk 26 that is coupled to the output shaft 22. The torque transfer disk 26 and the output shaft 22 are rotatable together. The torque transfer disk 26 and the output shaft 22 may be separate components. Alternatively, the torque transfer disk 26 and the output shaft 22 may be a single integrated component. However, other embodiments may not use a torque transfer disk.

In this example embodiment, the cam 20 is a cam groove that is disposed on the surface 14 of the support 12. However, in other embodiments the cam groove 20 may be disposed on the second surface 16. Alternatively, in other embodiments, there may be two cam groves with each cam groove being disposed on the opposing surfaces 14 and 16 of the support 12. It should be understood that the cam path shown in this embodiment is an arbitrary shape for demonstration purposes only and the cam path may be altered to better accommodate different thermodynamic systems.

The cam groove 20 is generally engageable by an end portion of a cam follower that is a journal pin 24, which may also be referred to as a journal bearing. The journal pin 24 follows the cam groove 20 while acting like a crank shaft. The journal pin 24 is connectable to an external drive input via a connecting rod (see FIGS. 5A-5B for an example). The external drive input may be any apparatus that may linearly displace the cam follower 24. For example, the drive input may be a conventional piston assembly or an embedded piston assembly, which is described in further detail below in accordance with the teachings herein, and the rod can be a piston connecting rod.

Balancing techniques as well as additional supports can be introduced to allow for the transfer of torque from the journal pin 24 to the output shaft 22. For example, while the support 14 is shown schematically as a block that holds the output shaft 22 as the attachment point, in an engine the support 14 will be provided by bearing supports between cylinder banks of an engine block. The torque transfer disk can also be used as a location for radially balancing unwanted vibrations caused by moving parts.

It should be understood that the term cam is not restricted to only an oblong-circular shape, but can be any path that allows the journal pin 24 to be radially displaced about the center of rotation (i.e. the aperture 18). As such, cam constrained designs can take the form of many shapes. The purpose of the cam profile is to ensure the drive members, e.g. the pistons in a piston assembly, follow the necessary path throughout their cycles (e.g. not just sinusoidal) to approximate an ideal thermodynamic cycle. Accordingly, depending on the application, the cam profile can be customized to most closely follow the ideal thermodynamic cycle and achieve maximum efficiency and power output. A particular advantage is the ability to generate a cam shape that enables a dwell in the linear piston movement during the cycle, where a piston is not in motion, which is required to accomplish some ideal thermodynamic cycles, such as the Stirling and Ericsson cycles. Also, the non-circular cam profiles described in accordance with the teachings herein can be applied to either EC or IC engines although the non-circular cam profiles may have different shapes for EC engines versus IC engines.

The torque transfer disk 26 is part of the cranking mechanism, which is implemented to take the load and stresses from the connecting rod 30 (see FIGS. 5A-5B) and transform the oscillatory movement from the piston rod 30 into desired rotational motion of the output shaft 22. Accordingly, the torque transfer disk 26 is a circular mass that is tailored to increase and balance the inertial effects of the reciprocating mass (i.e. the piston and connecting rod sprung masses) similar to a flywheel. The torque transfer disk 26 therefore acts as a counterbalance, whose implementation is dependent on the type of cam profile as this may add atypical vibrations that may need to be mass damped.

However, in contrast with conventional flywheels, the torque transfer disk 26 has a torque transfer disk groove 28, which is radial groove through which the journal pin 24 of the cam follower extends to engage the cam groove 20. The torque transfer disk groove 28 may also be referred to as a sliding pin groove. The torque transfer disk groove 28, the cam groove 20, and the journal pin 24 allow the linear motion of the drive input to be transformed into the rotational motion of the output shaft 22. As the drive input translates up and down, the cam follower is also translated linearly. The journal pin 24 of the cam follower engages with the cam groove 20 such that the journal pin 24 is radially constrained to follow the eccentrically, non-circular shape of the cam groove 20 but can also slide within the torque transfer disk grove 28 which provides a radially variable linkage that matches the eccentricity of the cam profile for the cam groove 20. For example, the distance of the proximal end of the cam groove 20 (i.e. the end that is closest to the axis of rotation and aperture 18) to the axis of rotation is the same as the smallest radial extent of the cam groove 20 from the axis of rotation, which is the top dead center, bottom dead center and 9 o'clock positions, while the distance of the distal end of the cam groove 20 is the same as the largest radial extent of the cam groove 20 from the axis of rotation which is the 3 o'clock position.

Accordingly, the journal pin 24 is constrained in all directions except for the radial direction and circumferentially about the axis of rotation. This allows the journal pin 24 to move along the cam groove 20 with two degrees of freedom, and tangential and radial forces are produced that act on the torque transfer disk groove 28. Accordingly, the radial position of the journal pin 24 changes as a full rotation takes place. As the path deviates further from the center of the output shaft 22, the journal pin 24 will be forced to slide outwards which changes the conventional circular trajectory of a typical crank shaft. For this example cam groove 20, the radial position of the journal pin 24 moves away from the aperture 18 as it travels clockwise from the 12 o'clock position to the 3 o'clock position and then the journal pin 24 moves closer to the aperture 18 as it travels from the 3 o'clock position to the 6 o'clock position.

Therefore, the torque transfer disk grove 28 is used to accommodate for the radial movement of the journal pin 24 which is able to slide within these geometric constraints while pushing, or being pushed by the piston connection which aids in the transfer of torque or load to the output shaft 22. For instance, allowing radial translation along the torque transfer disk groove 28 reduces the radial force of the journal pin 24 on the torque transfer disk groove 28. The tangential force of the journal pin 24 on the torque transfer disk groove 28 causes rotation of the torque transfer disk 26. Since the torque transfer disk 26 and the output shaft 22 are rotatably connected, rotation of the torque transfer disk 26 causes rotation of the output shaft 22. The output shaft 22 will attach to the intended application apparatus, which includes but is not limited to, an irrigation pump, an electrical generator, or used directly for powering a vehicle, for example.

Referring now to FIGS. 5A and 5B, shown therein are schematic side views of the radially variable drive mechanism 10 coupled to a connecting rod 42. The drive mechanism 10 comprises the support 12, the aperture 18, the cam groove 20, the journal bearing pin 24 and the torque transfer disk 26. The connecting rod 42 comprises an aperture 44 through which the journal bearing pin 24 extends as it engages and slides within the non-circular cam groove 20 during operation. In FIG. 5A, the journal bearing pin 24 is in the top dead center position and the associated radial value is approximately in the smallest radial value. The connecting rod 42 is not unique to this design but helps to visually explain how the radially variable drive assembly 10 may be connected to another mechanical device by a connecting rod. FIG. 5B is similar to FIG. 5A, but with the journal bearing 24 at approximately half way between top dead center and bottom dead center. It can be seen that as the radial value of the cam profile 20 changes during a revolution of the journal bearing pin 24, the journal bearing pin 24 will travel along the pin groove 28 to mechanically accommodate the radial variability.

Referring now to FIGS. 6A and 6B, shown therein are side views of an alternative embodiment of a radially variable drive mechanism 50 in first and second positions in the thermodynamic cycle which are 90 degrees out of phase. In this embodiment, the cam is provided by a cam lobe 52 that has a non-circular outer surface which is engaged by an end of the cam follower 56 of a connecting rod 54 that connects to a drive input, such as a piston assembly. In this example embodiment, the end of the cam follower is T-shaped. Furthermore, in this example embodiment, the cam follower 24 moves with a single degree of freedom. As the cam follower 56 linearly translates, the cam lobe 52 rotates. Furthermore, in this embodiment there is no torque transfer disk, It should be noted that the torque transfer disk (in this case) or a radially offset cranking mechanism is generally not needed when torque does not have to be transmitted by the drive mechanism.

It should be noted that the cam-follower design of FIG. 6A is an arbitrary cam design to show the principal of operation. In this case, the cam lobe 52 is intended to push a piston which will connect directly to the connecting rod 54, which is not conventionally done. The drive mechanism 50 cannot be used to transfer torque, however it can be used to control a passive piston to move in a non-sinusoidal fashion. In this iteration, this can offer a solution to the larger hot piston of an engine, since in this specific example, it is not implemented to be the piston responsible for work production. The outer shape of the cam lobe 52 can be designed to abide by an ideal thermodynamic cycle and offer volume variation for increased throughput of the system. The cam follower 56 is shown in FIG. 6A at the smaller radial value that would result in the minimal or no lift position. FIG. 6B is similar to FIG. 6A but with the cam follower 56 shown at the largest radial value, or highest point of lift, to translate the connecting rod 54 and its respective piston. The cam lobe lift coincides with the stroke required to carry out the appropriate displacement characteristics of the system.

It should be noted that the radially variable drive mechanisms shown in FIGS. 1-6B can be used to create and alter the dwell time for piston movement. This is accomplished by altering the shape of the cam to result in a pause of the linear movement of the piston, while rotation continues. These drive mechanisms are also applicable for any thermodynamic cycle in EC or IC engines whether they are open or closed loop.

Since the connecting rods 42 and 54 are responsible for transmitting force during conversion from linear to rotational motion, they may also experience a large compressive load from the expansion stroke, as well as tensile load from inertial effects of an engine or other system that they may be used with. Accordingly, the connecting rods 42 and 54 may be made from, for example, forged steel, high strength aluminum or high strength titanium.

The torque transfer disk 26 provides the radially variable groove 28 that allows for motion of the journal bearing pin 24 as well as the transmission of torque. Accordingly, the torque transfer disk 26 may be made from materials such as steel or aluminum, and may have a surface coating that is able to withstand the constant rubbing of the journal bearing pin 24. The surface coating may be determined by experimental (e.g. longevity) testing on a case-by-case basis.

The journal bearing pin 24 may be made from a material such as tooling steel. The cams 20 and 52 will be subject to constant surface shearing. Accordingly, the cams 20 and 52 may be made from materials such as steel or aluminum and have an adequate amount of surface treatment such that the cams 20 and 52 have high fatigue strength and high shear resistance. Both steel and aluminum can be treated to add a layer of hardening that gives resistance to the "rubbing" that may damage non-treated parts. The materials and surface treatment can be implemented on a case-by-case basis depending on various factors such as, but not limited to, the particular engine parameters (e.g. size, application, etc.) and the stress requirements.

In another aspect, the inventors have recognized that the expansion and compression processes in engines can be better implemented if a mechanically dynamic responsive mechanism is used that differs from conventional implementations since these processes, if overlooked, are a large reason for incomplete combustion as well as other negative aspects associated with poor or negligent engine designs. Therefore, in accordance with the teachings herein, there is provided at least one embodiment for a power mechanism that includes one or more embedded pistons where each embedded piston comprises a first piston that is disposed within a second piston and the second piston is disposed within a cylinder. In some embodiments only one of the pistons move. In other embodiments, both of the pistons move. In another aspect, the movement of the pistons can be controlled to a greater degree, such as by using the non-circular cam described previously, thereby affecting the thermodynamic cycle and improving the operation of an engine.

Work output is often associated with the power or expansion strokes that engines perform at least once per cycle. This is the process that utilizes excited working fluid molecules, often excited by a compression and a heat addition process, and extracts the energy from the working fluid at a state of elevated temperature and pressure by transforming thermal energy into kinetic energy. Conventionally, to carry out the expansion and compression operations in engines, a single piston per cylinder design is used. However, in conventional piston assemblies, a major source of thermal loss can be attributed to the transfer of the working fluid between the hot and cold regions of pistons that work together. Another source of thermal loss can be attributed to dead volume, which is the volume not displaced by a piston. Dead volume directly decreases the power and efficiency potential of EC engines.

Figure 12A:
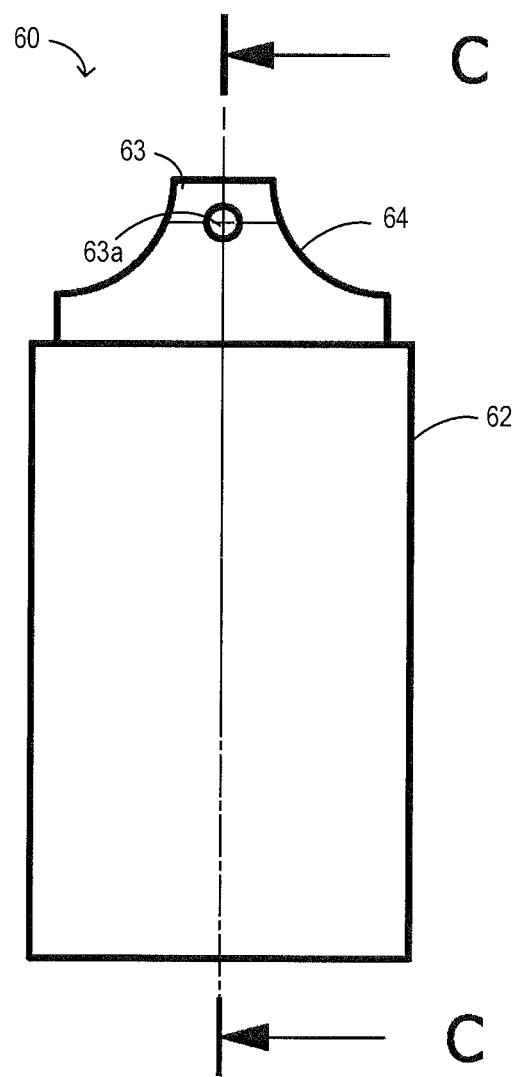
FIGS. 12A and 12B show a front view and a sectional side view, respectively, of the power mechanism of FIGS. 7-10 in a second phase of the Stirling thermodynamic cycle.
Figure 12B:
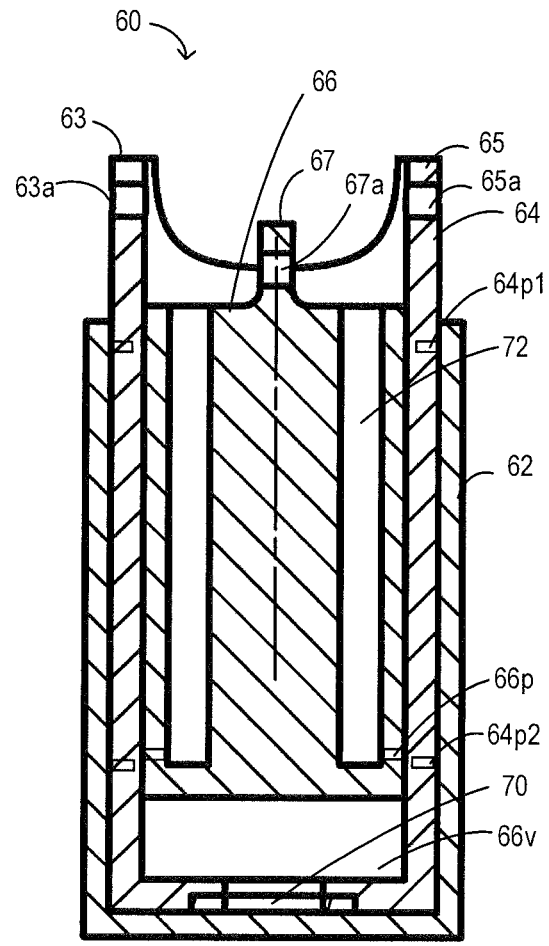

However, in accordance with another aspect of the teachings herein, an embedded piston arrangement can be used which provides two working volumes that share as much of the swept volume as possible and thereby occupy as much of the same physical space as possible. The working volume is the volume of the working fluid and includes a "hot volume" 64v which is the volume between the hot piston 64 and the cylinder 62 is the "hot volume" (see FIGS. 10, 13B, and 14B) and a "cold volume" 66v which is the volume between the cold piston 66 and the hot piston 64 (see FIGS. 11B and 12B). The swept volume is the volume that becomes displaced by a piston. The embedded piston arrangements described herein allow for overlapping swept volumes. Accordingly, an engine that uses the embedded piston arrangements described herein is more structurally compact than an engine that has separate hot and cold pistons in different locations, such as in conventional alpha-type Stirling engines. Additionally, the embedded piston arrangements described herein have a shorter regenerator pathway. Accordingly, the embedded piston arrangements described herein can be used to decrease the volume required for the piston arrangement, to reduce dead volume and to provide the engine manufacturer with greater control over the thermodynamic manipulation of a working fluid.

The various embedded piston arrangements described herein provide one or more advantages when used in an engine, especially EC engines, such as, but not limited to, one or more of:

(1) a unique method for closed loop thermal fluid manipulation;
(2) a reduction in thermal losses, which is a serious issue for engines;
(3) a reduction of fluid flow/transport issues and associated losses;
(4) a more compact implementation which enhances power density;
(5) a greater freedom in relative piston motion, which allows the engine to more closely follow an ideal thermodynamic cycle (and is currently one of the only viable methods of accomplishing the Ericsson cycle in a closed loop regenerative cycle);
(6) an increase in power and efficiency of an EC engine due to a reduction of dead volume, which is the volume that is not displaced by a piston; and
(7) an increase in the simplicity and compactness of EC engines (and also IC engines) by locating two pistons within the same cylinder separated by a regenerator transfer opening.

The ability to eliminate the above noted losses in engines will result in engines that are more efficient and have higher power densities, and may also make sustainable and flexible fuel EC engines more competitive. Furthermore, the piston diameter to stroke length ratio can be modified to obtain a higher rate of heat transfer and power output. This may be determined on a case-by-case basis depending on various parameters such as, but not limited to, and specific to things like heat source, temperatures, and intended application.

Referring now to FIGS. 7 to 10, shown therein is a side view, a perspective view, a front view, and a sectional side view, respectively, of an example embodiment of a power mechanism 60. The power mechanism 60 comprises an embedded piston arrangement in which a second piston 66 (i.e. cold piston) is disposed within a first piston 64 (i.e. hot piston) and the first piston 64 is disposed within a cylinder 62. The second piston 66 comprises a tab 67 with an aperture 67a. The first piston 64 comprises tabs 63 and 65 with apertures 63a and 65a, respectively. The tab 67 and one of tabs 63 and 65, as well as the corresponding aperture 67a and one of apertures 63a and 65a, may be used to receive first ends of connecting rods and a fastener to couple the first and second pistons 64 and 66 with the first ends of the connecting rods while the other ends of these connecting rods may be coupled to drive mechanisms as shown in FIGS. 15 to 30, for example. The power mechanism 60 may further comprise a regenerator 70. The regenerator 70 is located in an end wall of the first piston 64. The second piston 66 may further comprise an annular chamber 72 that runs parallel to the longitudinal axis of the second piston 66 between an end wall and extends to an open end of the second piston 66 near tab 67. The power mechanism 60 also comprises a working fluid which may be a gas or a fluid.

In general, the overall radii of the embedded piston arrangements described herein determines the overall power of an engine in which they are used. Generally speaking, the larger the displacement, the larger the amount of power that can be delivered. This is application dependent. The radii difference between the cylinder 62, the hot piston 64 and the cold piston 66 may be determined depending on the operational pressures that the engine has been designed to withstand. The pressure vessels will have a tendency to bow outwards (i.e. balloon) given the pressures. Accordingly, the wall thicknesses of the cylinder 62 and the hot piston 64 are determined in order to withstand these operational pressures with very little deflection and subsequent mechanical interference. This is a determined on a case-by-case basis. Simulations can be used to determine these parameters as well as experimental testing.

The cylinder 62 provides a sealed housing for the embedded piston configuration and allows heat to be transferred into the hot side and pressure to build-up in an engine that uses the embedded pistons. This enables the engine to rely on an assortment of fuel sources since the heat can be transferred inwards across a boundary layer (i.e. the end wall of the cylinder 62). Internal combustion (IC) engines, such as Otto, Diesel, and Atkinson engines, can use the embedded pistons but they require a specific type of fuel in order to harness power from it. IC engines may also benefit from the ability to over expand with an embedded piston embodiment. EC engines, such as Stirling and Ericsson engines, can also use the embedded pistons but in contrast can use a wide variety of fuel sources such as, but not limited to, solar thermal (e.g. parabolic mirror concentrators), biomass (including wood), and waste heat, for example, as long as there is sufficient heat supplied to the engine.

The regenerator 70 is a device that absorbs and returns energy to the working fluid inside of the piston arrangement during either a constant volume or a constant pressure regeneration process depending on the type of engine that uses the piston arrangement. Accordingly, the regenerator 70 can be used to increase the throughput of the system. While the working fluid is being transferred from the hot side to the cold side of the engine, the regenerator 70 is absorbing and storing energy from the working fluid, which has an effect on the thermodynamic cycle since the compression process of the working fluid and the heat rejection process for the entire system follows thereafter. A cooler working fluid will require less work input from the engine to compress it. This will fundamentally improve the overall efficiency and performance of the engine. When the working fluid is being transferred from the cold side of the engine back to the hot side of the engine the opposite process occurs, where the regenerator 70 returns the previously absorbed energy back to the working fluid thereby increase its temperature. Due to the restoration of energy to the working fluid from the regenerator 70, there will be a smaller demand of energy from the heat source to the engine. This will also improve the efficiency of the engine. The regenerator 70 therefore improves the performance and efficiency of EC heat engines.

The regenerator 70 may take many forms to accomplish the heat transfer, including, but not limited to, a porous medium, a random network of wire fibers, a wire mesh, or other passages with sufficient surface area to provide sufficient heat transfer to the working fluid passing therethrough. Depending on the operational temperatures of the engine, the regenerator 70 may be made using a variety of materials including, but not limited to, one or more of stainless steel, copper and aluminum.

It should be noted that in some embodiments the regenerator 70 is optional. This generally depends on the thermodynamic cycle, for example, in some IC or open cycles (e.g. Otto and Diesel) regeneration may not be needed. The working fluid may also be transferred along a path external to the piston cylinder, but this will take up additional space.

The piston 64, which may be referred to as the hot piston, displaces the working fluid from the hot side to the cold side of the engine, and vice versa. The hot piston 64 is also responsible for occupying the hot space 64v to govern the pressure of the working fluid as it expands. In particular, the hot piston 64 governs the expansion volume as the crankshaft (not shown) rotates. This is used to harness the high temperatures/pressures to transform energy from the working fluid into the connected crankshaft. The heat can be added beneath or around the hot piston 64 to expand and add energy to the working fluid. The hot piston 64 also forces the working fluid through the regenerator 70. In particular, as the hot piston 64 is being driven downwards, it forces the hot working fluid through the regenerator 70 where energy is absorbed from the working fluid and the working fluid is pushed to the cold side of the engine. When the hot piston 64 is pulled upwards, the opposite occurs, where the cold working fluid is pushed through the regenerator 70 where it gains energy from the regenerator 70 and is now back in the hot side of the engine. An advantage of this configuration with the hot piston 64 is that it allows for a compact design while virtually eliminating any dead volume within the engine, which results in improved efficiency and higher power output. In this configuration the only dead volume is the passageway between the two volumes (i.e. typically the regenerator 70). However, if additional channels or grooves need to be added for additional heat transfer (i.e. regeneration) purposes then there may be additional dead volume.

The hot piston 64 will be exposed to high temperatures and must be able to withstand constant exposure to these high temperatures without warpage or melting. Accordingly, the hot piston 64 can be made from, for example, high temperature resistant steels or aluminum alloys that have an insulation surface layer. The hot piston 64 may also use piston seals 64$p1$ and 64$p2$ for sealing, which in some iterations can withstand high heat and receive no lubrication. The piston seals may be made from materials such as a Polytetrafluoroethylene (PTFE) based material, such as Teflon, for example. If exposed seals are to be used, then standard metallic piston seals can be used as long as they are lubricated. However, it should be noted that there may be some engine applications that do not require the use of piston rings although their absence may lead to a bit of leakage and reduced performance (depending on tolerances).

The piston 66, which may be referred to as the cold piston, moves in order to compress the working fluid within the engine as the working fluid is moved to the cold side of the engine. Accordingly, the cold piston 66 controls the compression volume (i.e. cold space 66$v$), and utilizes the hot piston 64 as its cylinder. Therefore, the cold piston 66 can slide within the larger outer piston 64. The cold piston 66 is responsible for cooling and compressing the working fluid while operating with the outer piston 64. During the isothermal heat addition process, the cold and hot pistons 66 and 64 move upwards together to expand the working fluid to produce work output. During the isothermal heat rejection process, the hot piston 64 remains in the "top dead center" location adjacent to the end wall of the cylinder 62 while the cold piston 66 moves towards the hot piston 64 and compresses the cold working fluid which in turn rejects heat through the cold piston 66.

In this example embodiment, the heat is rejected through the annular chamber 72 which may be referred to as a cold reservoir. The annular chamber 72 is an example of one way to reject heat. For example, the annular cylindrical chamber 72 may receive a coolant that is capable of being cooled by an external cooling source. In other embodiments other elements can be used to reject the heat and provide cooling such as directly through the piston 66 itself, or around the piston 66 by adding one or more cooling fins or a heat exchanger, such as a water cooled heat exchanger, or by using passive corrective methods and the like.

The cold piston 66 can be made using typical piston materials that are used in IC engines, such as aluminum alloys. The cold piston 66 can also use piston seals 66$p$, which can be made using, for example, metallic or PTFE based rings.

The location of the cold piston 66 within the hot piston 64 essentially overlaps the location of both working volumes and the displacement of the working fluid becomes minimal. This compact design is advantageous in comparison to other piston configurations since it reduces the total space required while drastically minimizing the dead volume and associated heat transfer losses, and it will allow the engine the freedom to follow any thermodynamic cycle that is desired as determined by the cam profile used in the corresponding crank mechanism (see, for example, FIGS. 15 to 30). The embedded piston arrangement also minimizes leakage, because the fluid transfer is between the hot and cold pistons 64 and 66, so the only leakage points are around the edges of the hot and cold pistons 64 and 66, which can easily be sealed off using various techniques such as, but not limited to, high tolerances, piston rings, and lubricant.

Since the heat is transferred from outside of the hot and cold pistons 64 and 66 in an EC engine, as opposed to inside with an IC engine, the heat transfer is more challenging and more important to determine when selecting the size and aspect ratio for EC engine pistons. The hot and cold pistons 64 and 66 can have relatively larger diameters and shorter stroke lengths as compared with standard pistons for IC engines, particularly if the heat source is located at the end of the cylinder 62. Numerical modelling and experimental testing can be used to determine the best diameter and stroke lengths based on the intended application of the embedded pistons.

Figure 14A:
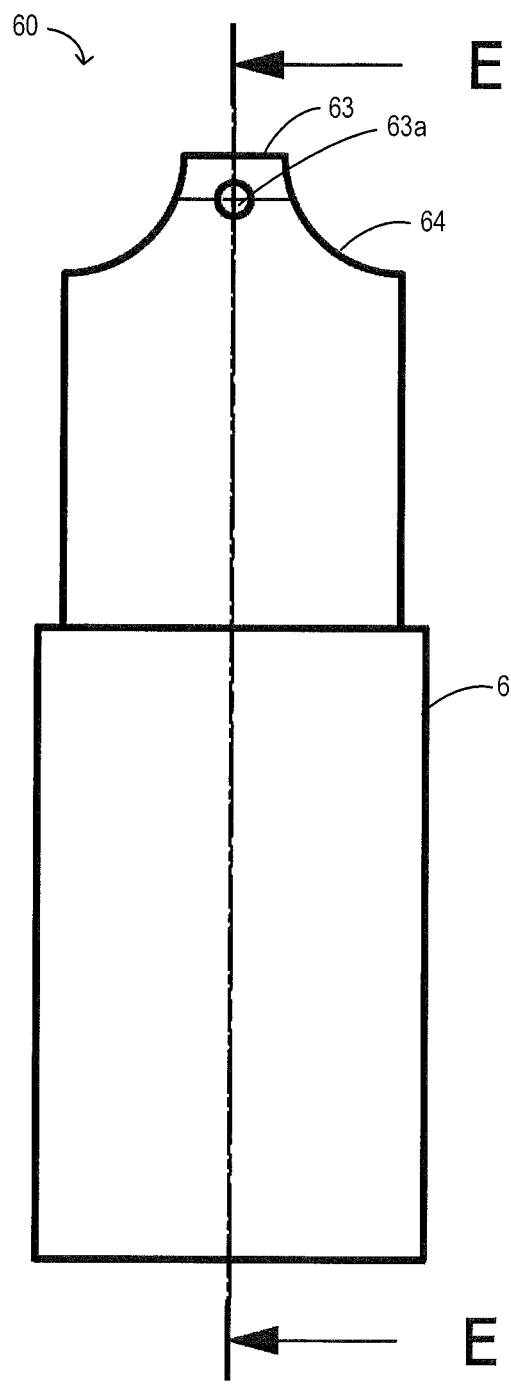
FIGS. 14A and 14B show a front view and a sectional side view, respectively, of the power mechanism of FIGS. 7-10 in a fourth phase of the Stirling thermodynamic cycle.
Figure 14B:
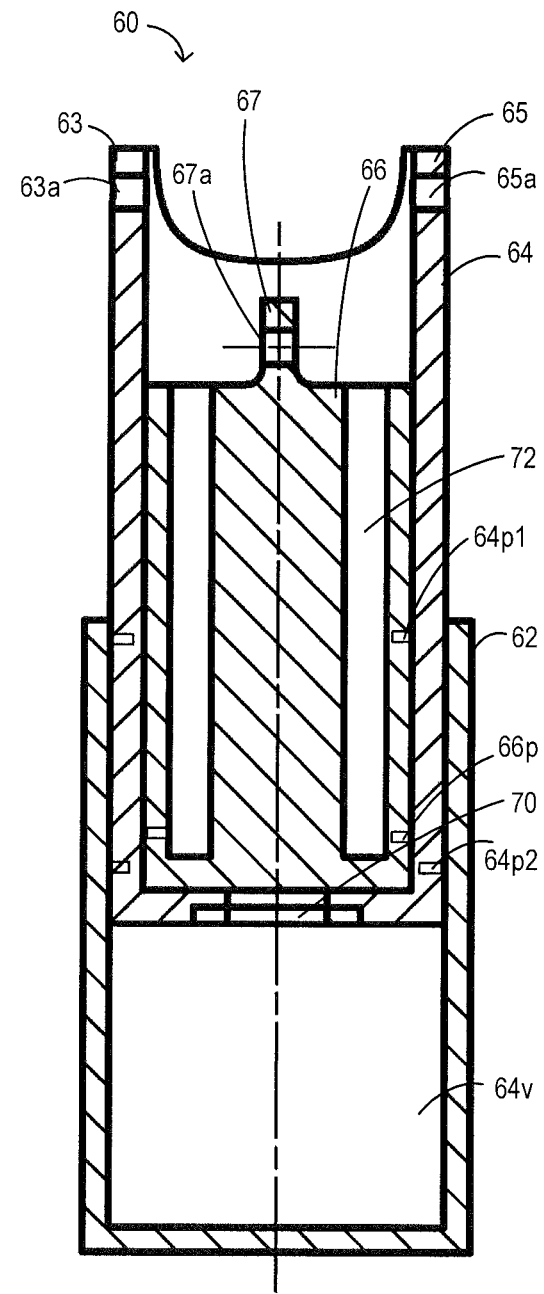
Figure 16:
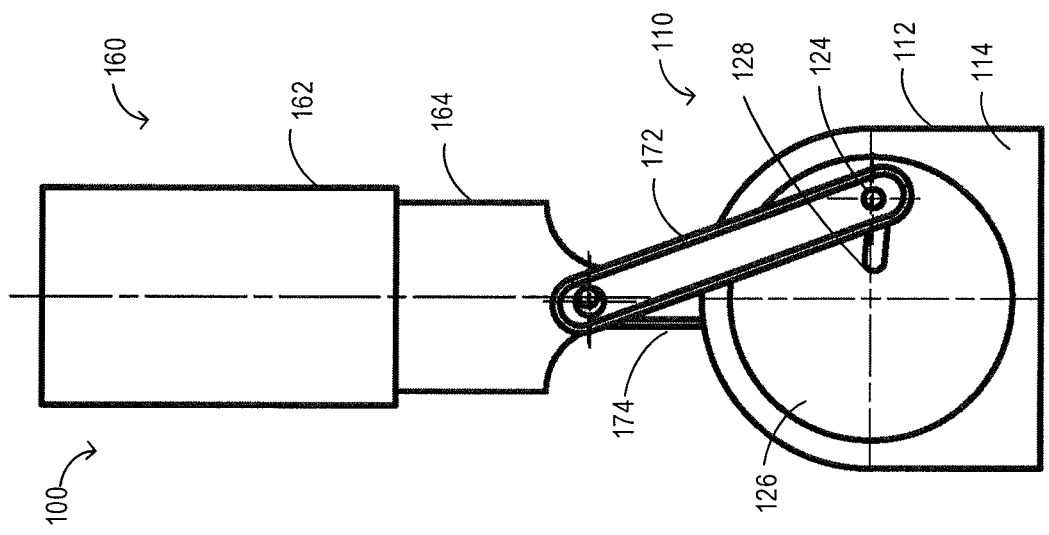
FIGS. 15 and 16 are perspective and front views, respectively, of a portion of an example embodiment of an engine assembly which uses a single support and two torque transfer disks for the drive mechanism in accordance with the teachings herein.
Figure 15:
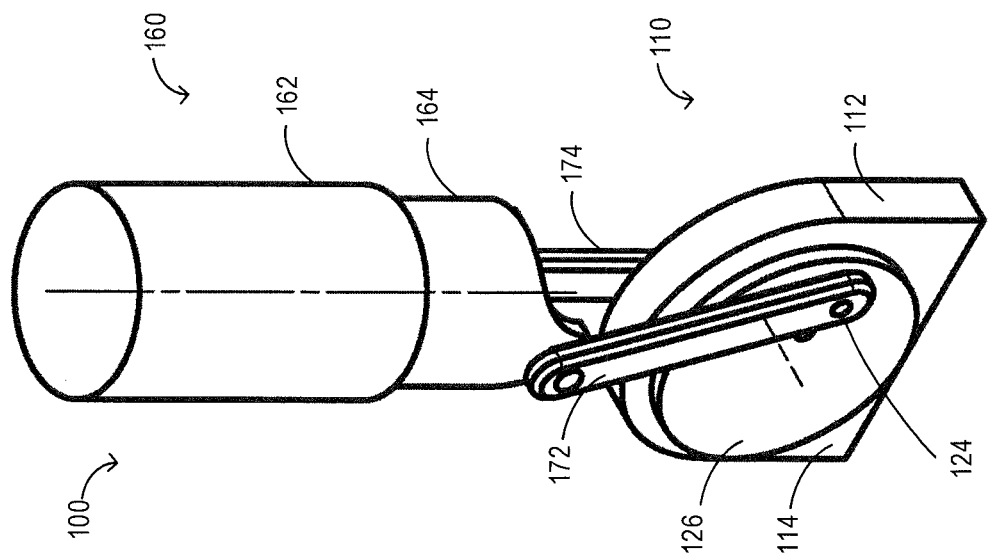
Figure 18:
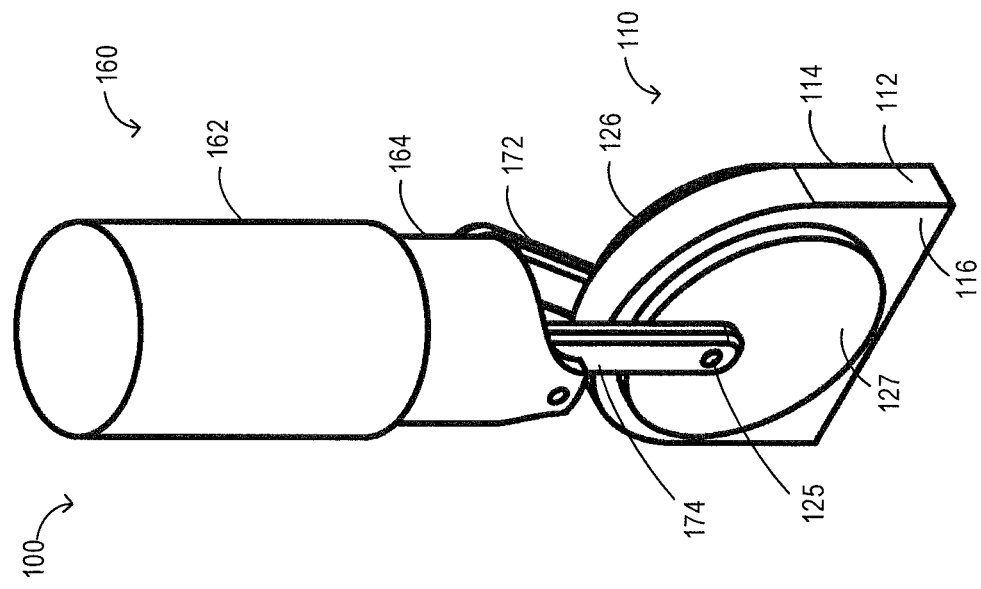
FIG. 18 is a perspective top view of the engine assembly of FIGS. 15 to 17 showing both torque transfer disks.
Figure 17:
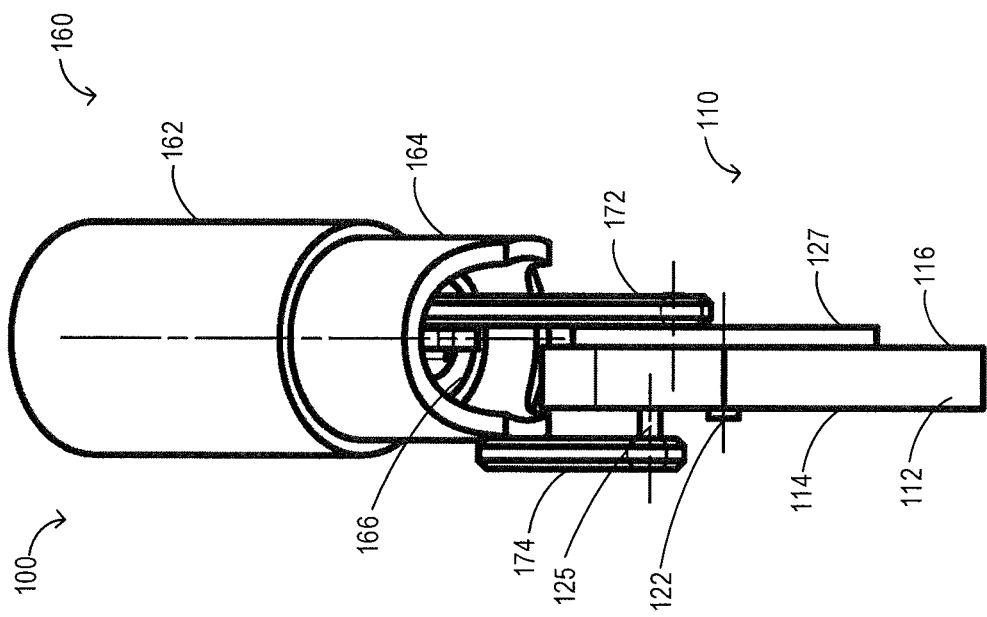
FIG. 17 is a perspective bottom view of a portion of an example of the engine assembly of FIGS. 15 and 16 in which only one torque transfer disk is shown.
Figure 20:
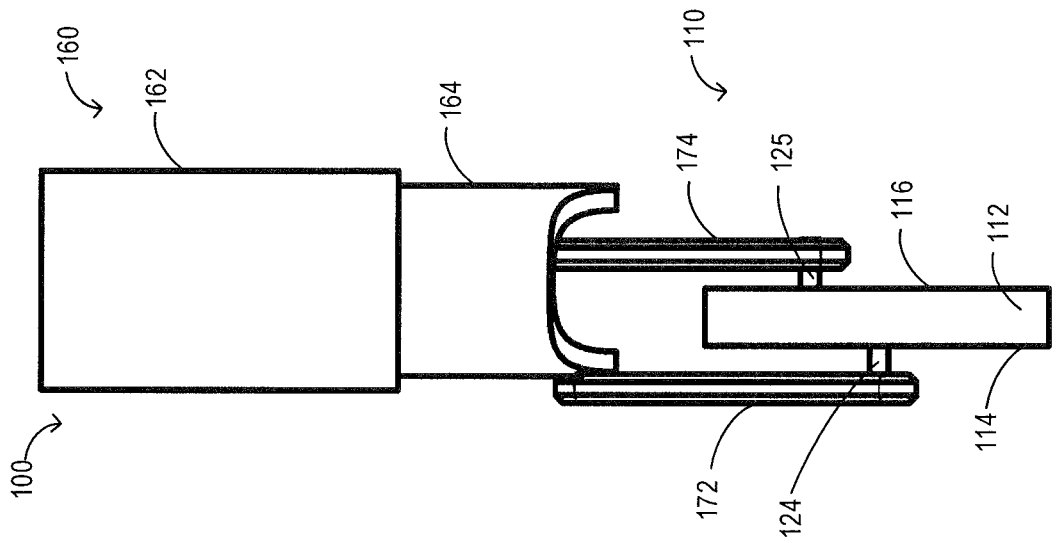
FIGS. 19 to 22 are perspective top, side, perspective top and perspective bottom views, respectively, of the engine assembly of FIGS. 15 to 18 in which the torque transfer disks are not shown in order to show the inner workings.
Figure 19:
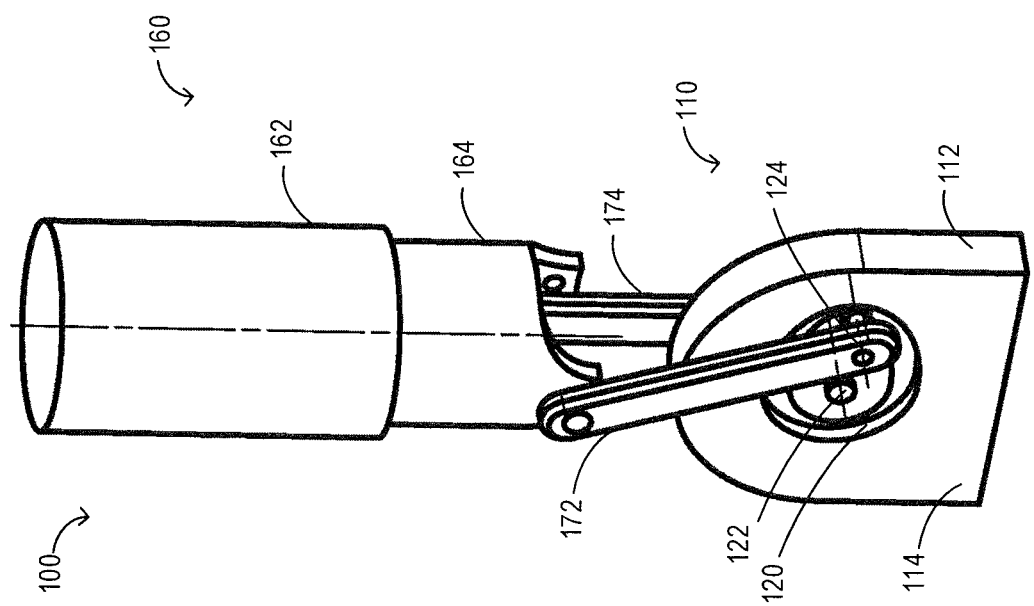
Figure 22:
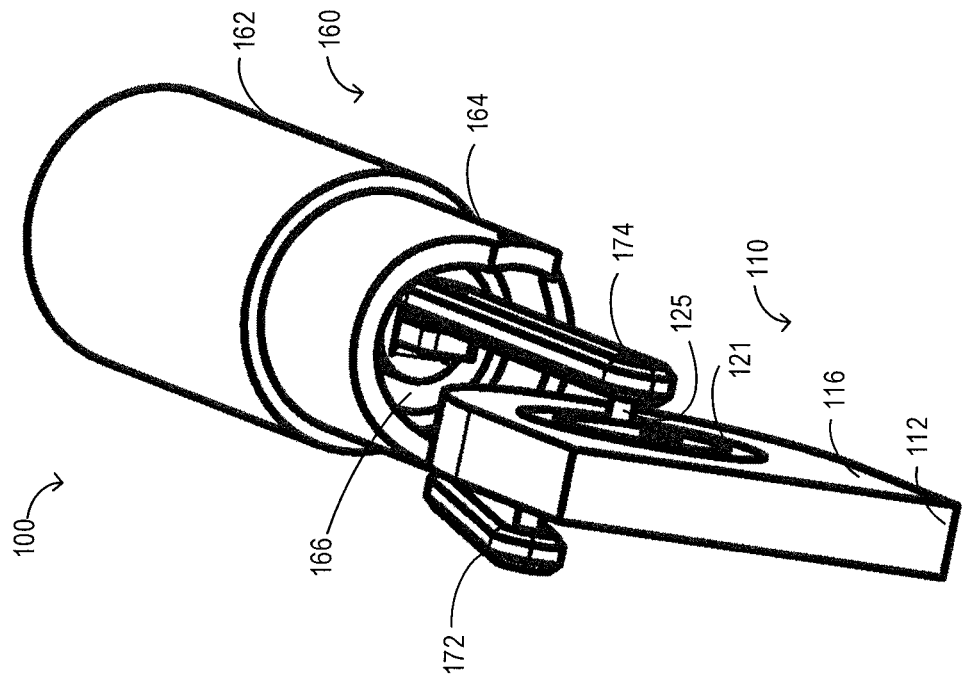
Figure 21:
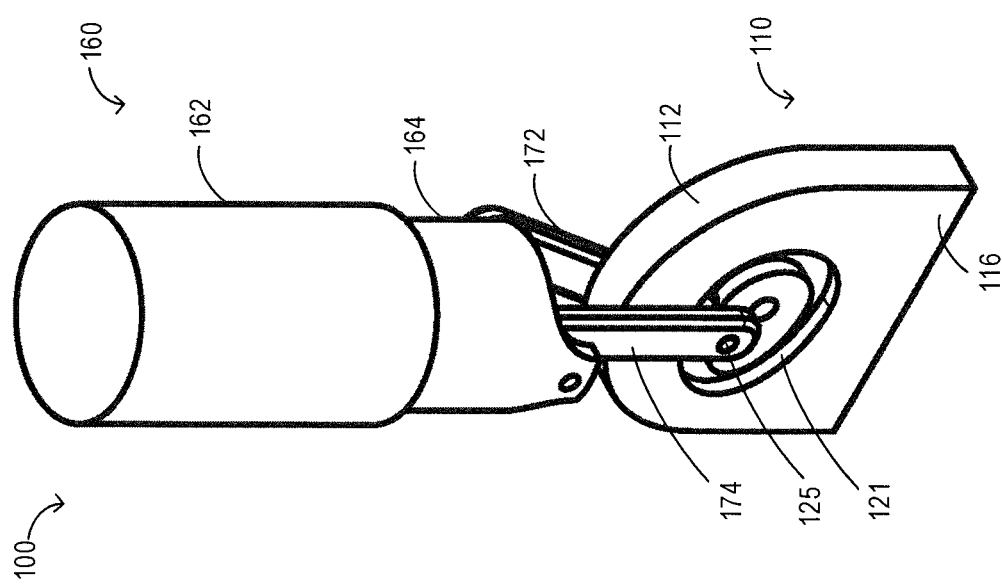
Figure 24:
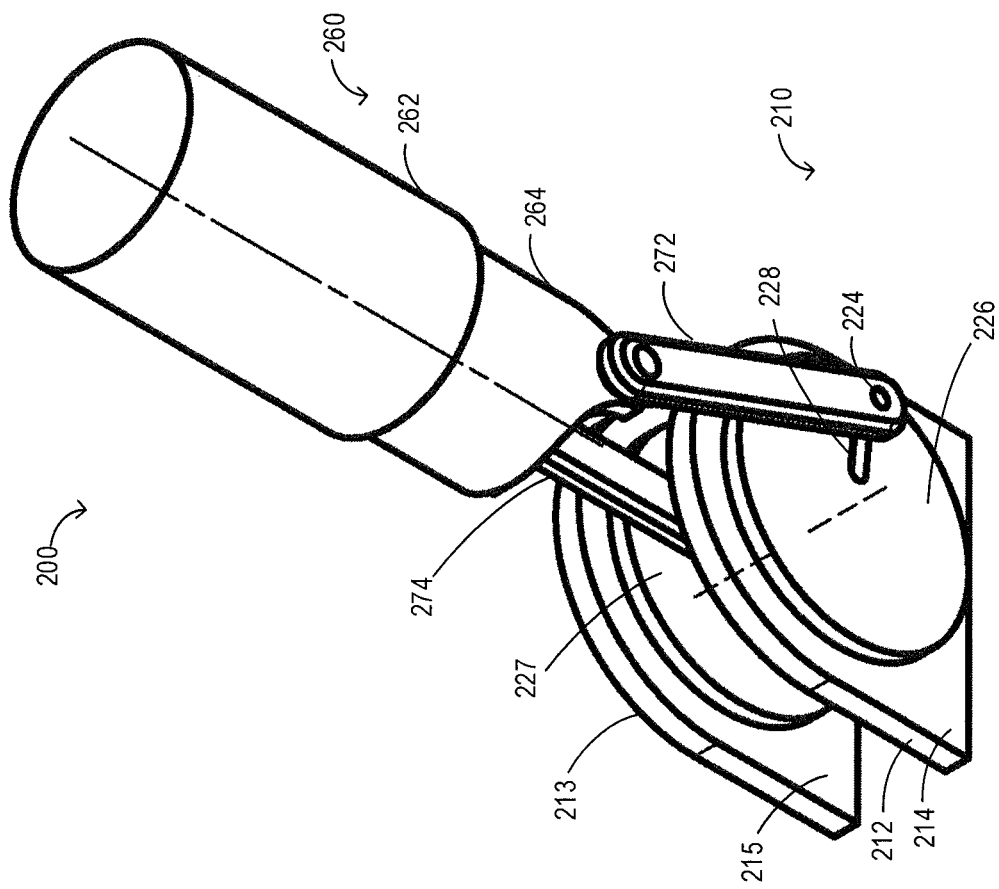
FIGS. 23 to 27 are perspective top, perspective top, front, bottom perspective and perspective rear views, respectively, of a portion of an example of another embodiment of an engine assembly which uses two supports and two torque transfer disks in accordance with the teachings herein.
Figure 23:
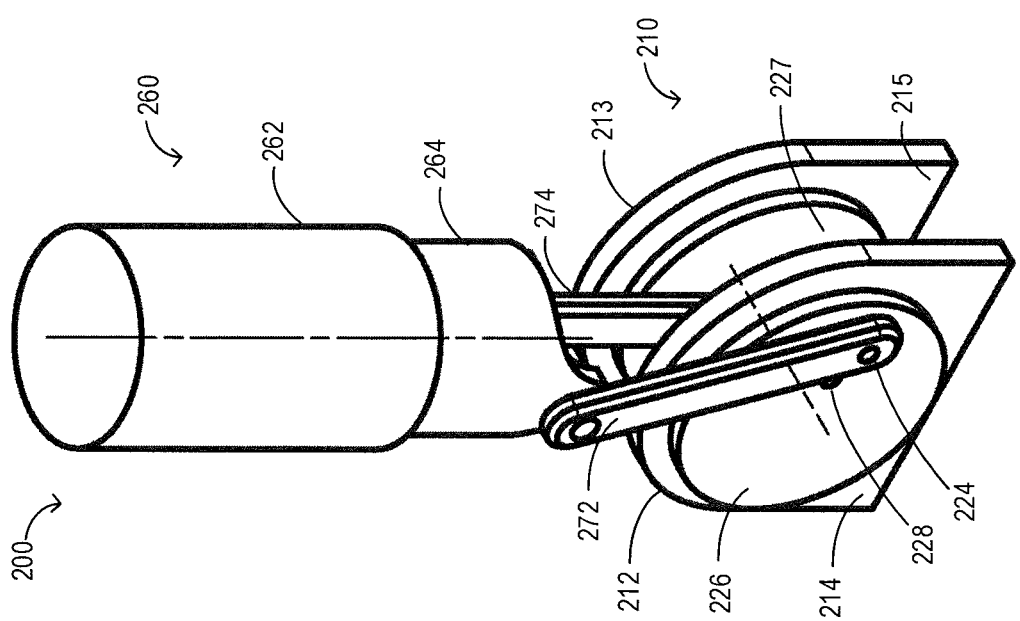
Figure 26:
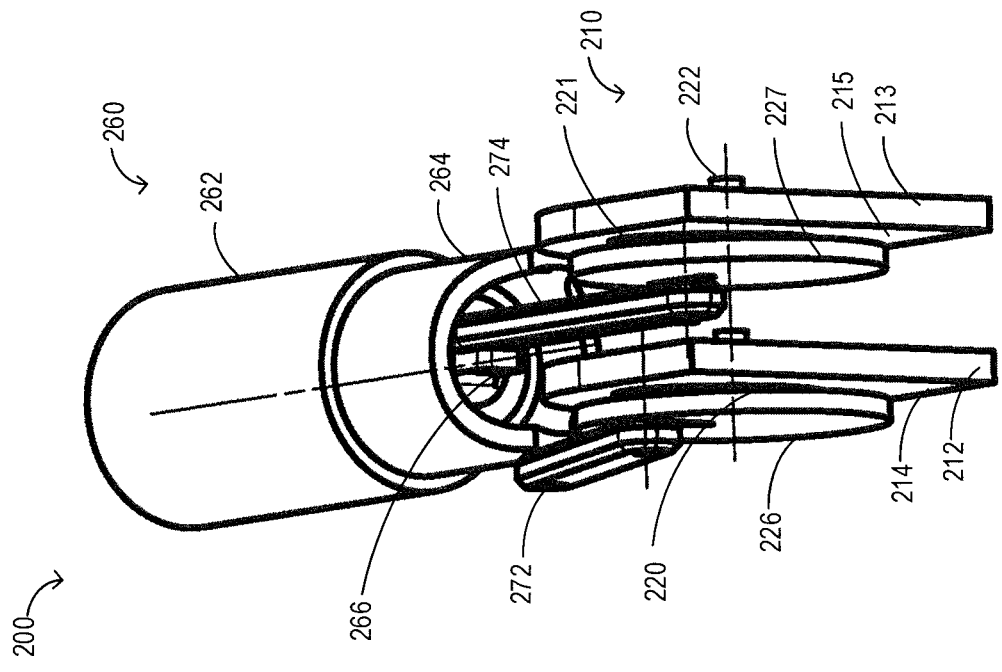
Figure 25:
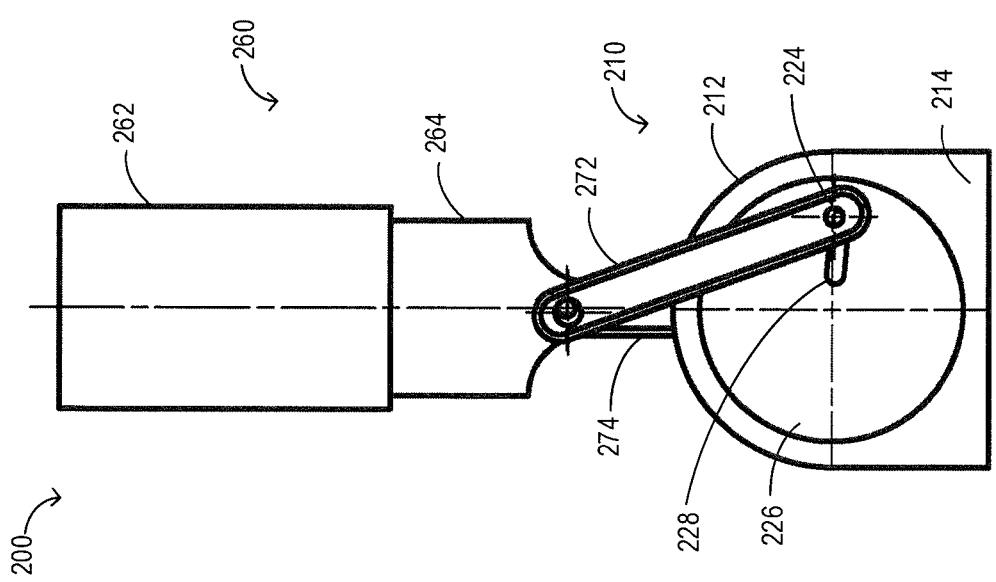
Figure 28:
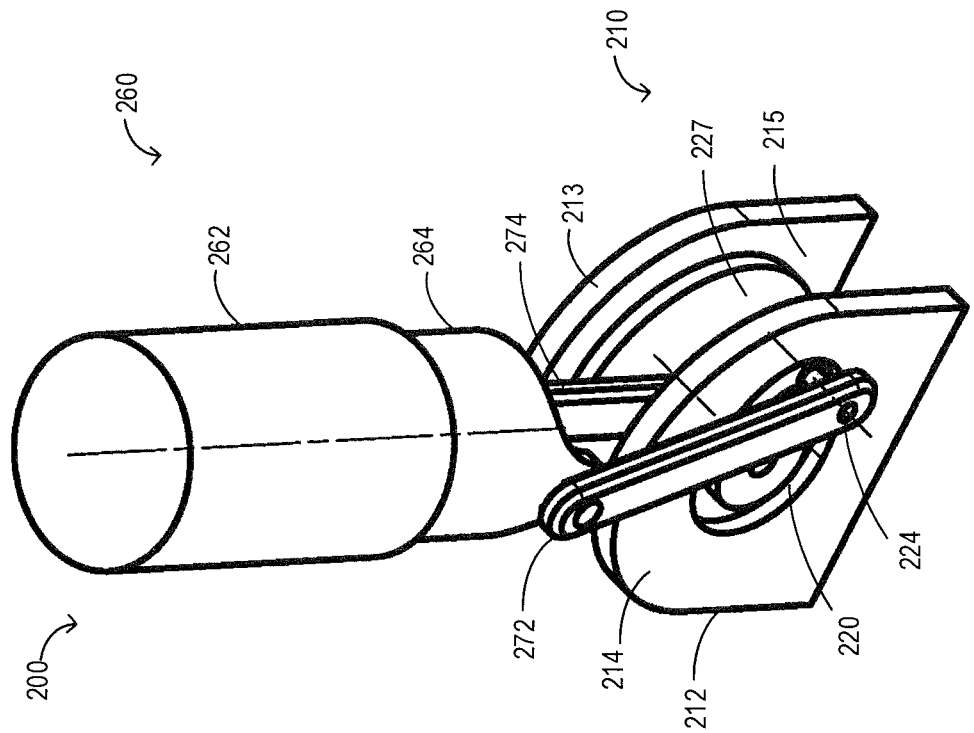
FIGS. 28 to 30 are perspective front, side, and front views, respectively, of the engine assembly of FIGS. 23 to 27 with one of the torque transfer disks removed to show the inner workings.
Figure 27:
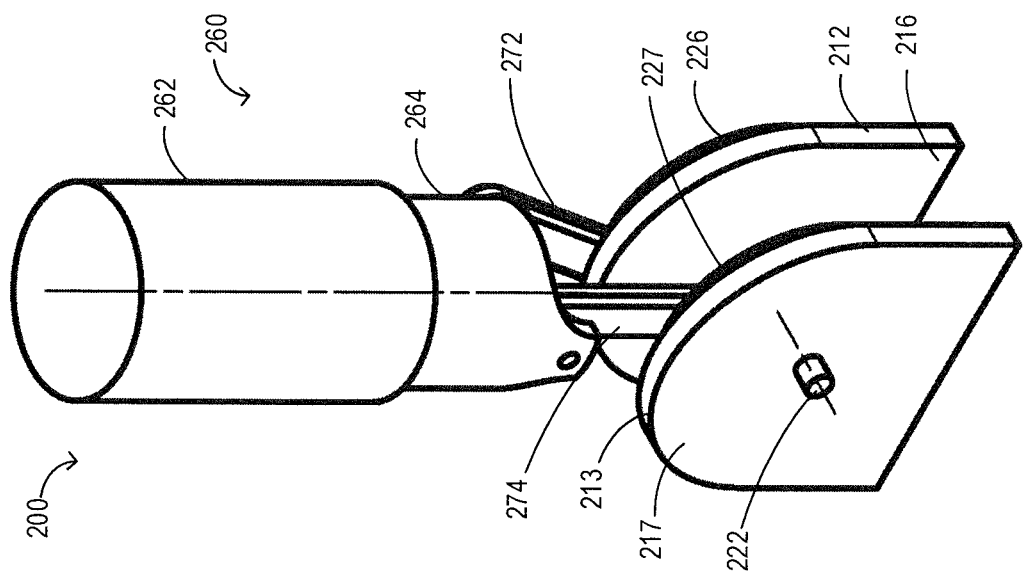
Figure 30:
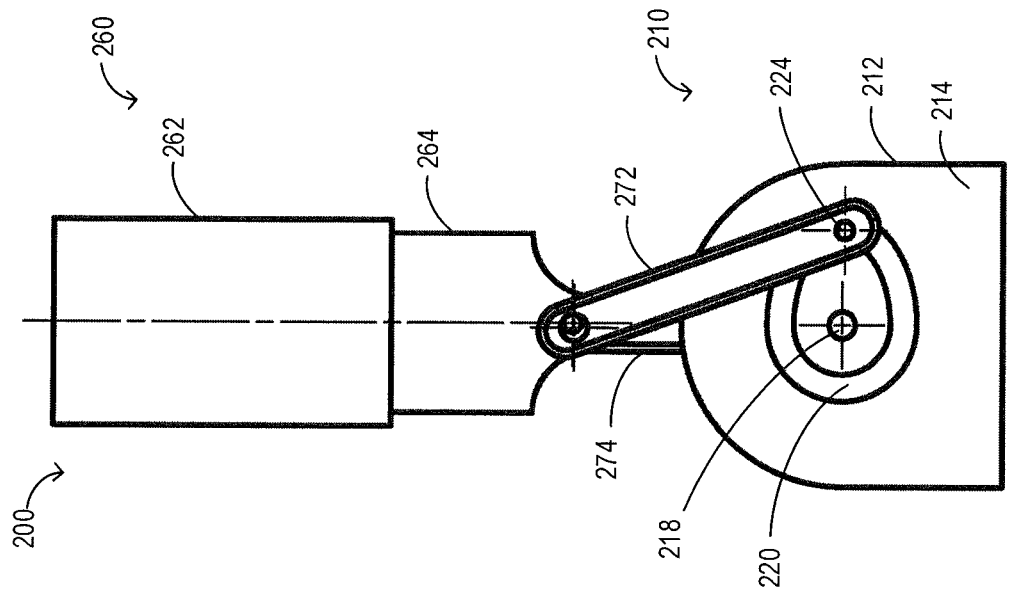
Figure 29:
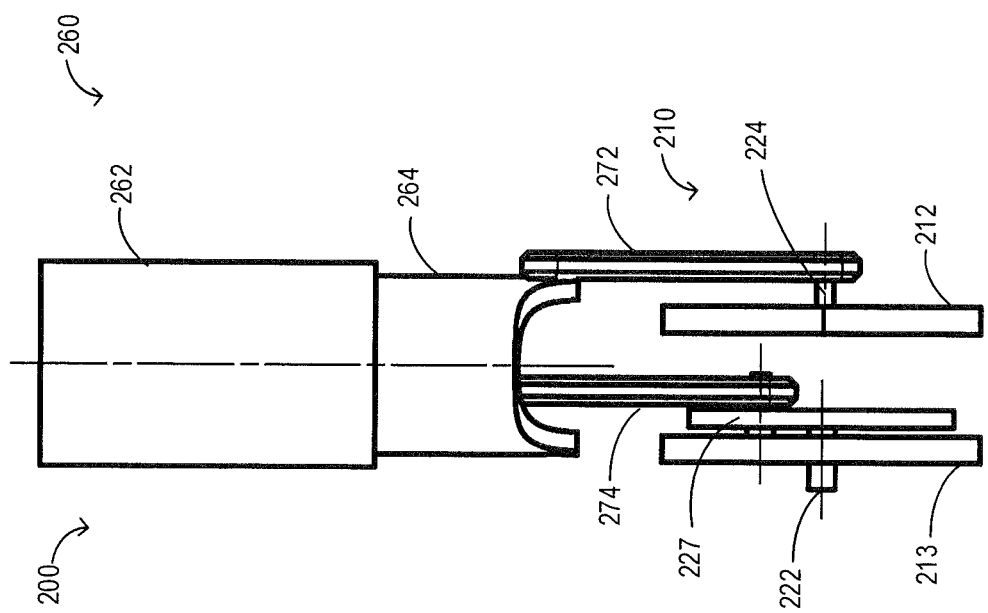

Referring now to FIGS. 10 to 14B, the Stirling thermodynamic cycle with respect to the piston arrangement 60 is shown. During use, heat is applied from an external heat source and is transferred into the hot side of the piston arrangement 60 through the cylinder 62 to the hot piston 64 as shown in FIG. 10. The working fluid is heated and passed through the regenerator 70 as the hot piston 64 moves towards the hot surface of the cylinder 62 as shown in FIGS. 11A-11B. During this time, the regenerator 70 absorbs energy from the heated working fluid and decreases the temperature of it. The working fluid is then compressed by the motion of the cold piston 66 as the cold piston 66 moves towards the end portion of the hot piston 64 where the regenerator 70 is located, as shown in FIGS. 12A-12B, during which time heat is rejected through the cooling side of the cold piston 66. The hot piston 64 then moves away from the end wall of the cylinder 62, as shown in FIGS. 13A-13B, and working fluid passes through the regenerator 70 again, where this time it gains energy from the regenerator 70 and increases in temperature. Further increases in the temperature of the working fluid occur as the working fluid then receives heat from the external heat source and the hot and cold pistons 64 and 66 continue to move away from the end wall of the cylinder 62 as shown in FIGS. 14A-14B. The cycle then repeats and the cycle can repeat continuously. Accordingly, in this example, both the hot piston 64 and the cold piston 66 move concentrically with respect to each other within the stationary cylinder 62 during this particular thermodynamic cycle (i.e. Stirling cycle).

The thermodynamic cycle shown in FIGS. 11A to 14B is meant as an example and there may be other thermodynamic cycles that are possible when the embedded piston arrangement is coupled with a crankshaft mechanism and one or more cams having particular shapes to cause one or both of the pistons 64 and 66 to move during the various phases of the thermodynamic cycle. For example, there can be embodiments in which the cold piston 66 can remain stationary while the hot piston 64 can move with the help of following a cam and crankshaft mechanism during the heat addition and heat rejection processes described above. Alternatively, there can be embodiments in which the hot piston 64 remains stationary and the cold piston 66 moves during the heat addition and heat rejection processes described above.

The embedded pistons described in accordance with the teachings herein can generally be used to improve the performance of a piston-reciprocating device, and are applicable to both IC and EC engines such as, but not limited to, the Otto, Diesel, Atkinson, Stirling, and Ericsson engines as well as other engines that utilize a piston or displacer for operation.

The embedded piston design works particularly well with closed loop heat engines and offers a mechanical arrangement to both harness work output and produce work input for heat engines. By minimizing the volume required to perform such processes the working fluid does not need to travel along relatively long paths to complete the thermodynamic cycle. This minimizes losses associated with fluid transport, such as conduction and pumping losses, decreasing flaws associated with all types of Stirling and Ericsson engines. Also, the embedded piston technology allows for more simple and compact engine units to be made for the same power output loads, which will reduce manufacturing costs. For IC engines, the embedded piston embodiment can enable the utilization of two pressure vessels simultaneously, which allows for over expansion of the working fluid during the power production stroke. This also provides a straightforward way to accomplish the Atkinson cycle, whereas modern conventional IC engines typically accomplish this differently with valve timing. However, by allowing both the pistons to fully expand within their respective cylinders, the compact embedded piston arrangements described herein allow for potentially double the expansion volume. By allowing the hot piston 64 to travel to its most open position while the cold piston 66 follows and travels to its most outward position within the hot piston 64, this essentially doubles (or nearly doubles) the maximum expansion volume possible for a single piston arrangement.

Furthermore, as mentioned previously, the non-circular cam profiles described herein can be used with the embedded pistons to change the velocity and acceleration profile of the embedded piston motion such that the motion deviates from a perfect circle in accordance to a predetermined path, which enables the embedded pistons to travel linearly in a non-sinusoidal manner. This can allow the embedded piston arrangement to be implemented such that it more closely approximates the ideal/theoretical thermodynamic cycle or another desired thermodynamic response compared to conventional designs. By further restricting embedded piston movement, it can allow better compliance with engine processes to hold more suitable pressure or volumetric attributes during operation. By complying to the appropriate operational properties of a given cycle, a net benefit of extracting more useful energy from the heat or fuel source can be achieved and thus more efficiency and power can be provided in a more compact engine. To date, there have been no engines that deviate from continuous harmonic sinusoidal piston motion.

The output from any of these engine systems that utilize at least one of the non-circular cam profile and the embedded piston arrangement can be used for a wide variety of target applications. For example, the shaft work that is produced by the mechanical piston arrangements at various rates can be utilized for power generation by coupling it with an electrical generator, or it can be used for mechanical work for other auxiliary devices such as an irrigation pump, a compressor, or to accelerate a vehicle.

When the embedded pistons and the non-sinusoidal drive mechanisms are used alone, or in combination, with an engine or other piston reciprocating device, there can be an increase in power output, power density, and thermal efficiency depending on the type of engine or machine that they are applied to.

Figure 32:
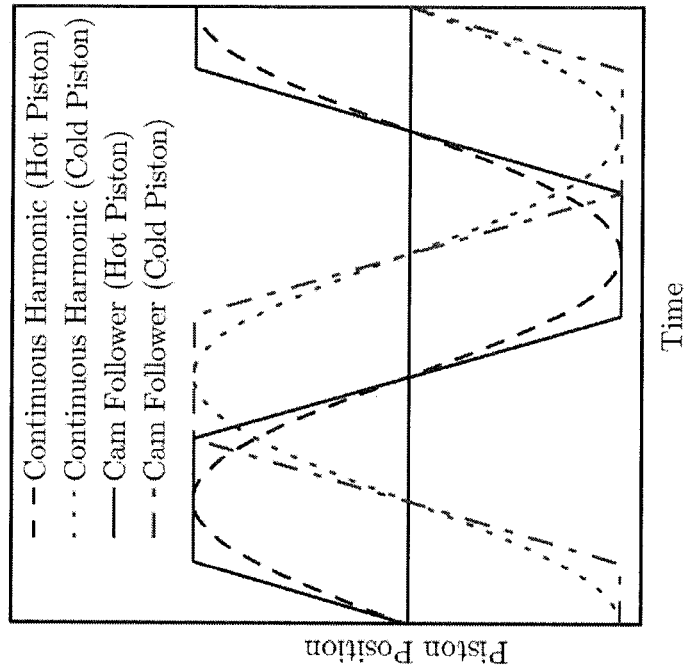
FIG. 32 shows a graph of an example piston motion for a conventional sinusoidal cycle and piston motion for a non-circular cam profile for the hot and cold pistons of a power mechanism.

FIGS. 15 to 30 show various views of portions of different engine assembly embodiments which use drive mechanisms and power mechanisms in accordance with another aspect of the teachings herein. For these engine assembly embodiments, two non-circular cam profiles are generally used, one for the hot piston and one for the cold piston of the power mechanisms. The cam profiles can initially be based on converting the engine cycle from the conventional sinusoidal profile into four equal segments for the hot and cold pistons, as shown in FIG. 32. These four equal segments for the thermodynamic cycle are not the optimal configuration and further refinements can be made to the cam profiles through numerical modelling (such as via COMSOL) to achieve certain characteristics for a particular engine assembly. Experimental testing will also be done to determine the cam profiles due to the complexities in the engine and the transient nature of the heat transfer.

Referring now to FIGS. 15-22 shown therein are various views of a portion of an example embodiment of an engine assembly 100 which comprises a drive mechanism 110 and a power mechanism 160 in accordance with the teachings herein. The example engine assembly 100 generally incorporates a single support 112 and two torque transfer disks 126 and 127. However, other variations are possible. Element 122 is the output shaft and a device such as a pulley or gear can be coupled to the output shaft 122 to drive a device. Both torque transfer disks 126 and 127 can be seen in FIG. 18; however, for ease of illustration and to show the inner workings of the engine assembly 100, FIG. 17 only shows the torque transfer disk 126 while FIGS. 19 to 22 do not show the torque transfer disks 126 and 127.

The drive mechanism 110 includes a single support 112 with a first surface 114 and an opposing second surface 116, a first cam groove 120 on the first surface 114 and a second cam groove 121 on the second surface 118. The drive mechanism 110 further comprises a cam follower pin 124, and a torque transfer disk 126 with a pin groove 128. The cam follower pin 124 extends through and slides radially within the pin groove 128 as it slidingly engages the cam groove 120 and rotates about the rotational axis of the output shaft 122 coupled to the support 112 as described previously for the drive mechanism 10. The drive mechanism 110 further comprises a second cam follower pin 125, and a second torque transfer disk 127 with a second pin groove (not shown).

The power mechanism 160 comprises the cylinder 162, the hot piston 164 and the cold piston 166. The power mechanism 160 also comprises a regenerator and PTFE and metallic piston seals (all not shown). However, it should be noted that there can be other embodiments which do not have a regenerator, do not have piston seals or do not have both the regenerator and the piston seals. The hot piston 164 is coupled to the cam follower pin 124, the cam groove 120 on the first surface 114 of the support 112 and the torque transfer disk 126 via a connecting rod 172 and the pin groove 128. The cold piston 166 is coupled to the cam follower pin 125, the cam groove 121 on the second surface 116 of the support 112 and the torque transfer disk 127 via a connecting rod 174 and the pin groove (not shown) on the torque transfer disk 127.

The cam groove 120 on the surface 114 dictates the motion of the hot piston 164 and the second cam groove 121 on the opposing surface 116 of the support 112 dictates the motion of the cold piston 166. The shape of the cam grooves 120 and 121 can be the same or they can be different depending on the particular thermodynamic cycle that is being approximated and the application for which the embedded piston arrangement is used.

Referring now to FIGS. 23-30 shown therein are various views of a portion of an example embodiment of an engine assembly 200 which comprises a drive mechanism 210 and a power mechanism 260 in accordance with the teachings herein. The example engine assembly 200 generally incorporates two supports 212 and 213 and two torque transfer disks 226 and 227. However, other variations are possible. Both torque transfer disks 226 and 227 can be seen in FIGS. 23, 24, 26 and 27; however, for ease of illustration and to show the inner workings of the engine assembly 200, FIGS. 28, 29 and 30 does not show the torque transfer disk 226.

The drive mechanism 210 includes the support 212 with a first surface 214 and an opposing second surface 216 and a first cam groove 220 on the first surface 214. The drive mechanism 210 also includes the second support 213 with a first surface 215 and an opposing second surface 217 and a second cam groove 221 on the first surface 215. The drive mechanism 110 further comprises a cam follower pin 224, and a torque transfer disk 226 with a pin groove 228. The cam follower pin 224 extends through and slides radially within the pin groove 228 as it slidingly engages the cam groove 220 and rotates about the rotational axis 218 of the supports 212 and 213 as described previously for the drive mechanism 10. The drive mechanism 210 further comprises a second cam follower pin 225, and a second torque transfer disk 227 with a second pin groove (not shown).

The power mechanism 260 comprises the cylinder 262, the hot piston 264 and the cold piston 266. The power mechanism 260 also comprises a regenerator and PTFE and metallic piston seals (all not shown). However, it should be noted that there can be other embodiments which do not have a regenerator, do not have piston seals or do not have both the regenerator and the piston seals. The hot piston 264 is coupled to the cam follower pin 224, the cam groove 220 on the first surface 214 of the support 212 and the torque transfer disk 226 via a connecting rod 272 and the pin groove 228. The cold piston 266 is coupled to the second cam follower pin 225, the cam groove 221 on the surface 215 of the support 213 and the torque transfer disk 227 via a connecting rod 274 and the pin groove (not shown) on the torque transfer disk 227.

The cam groove 220 on the surface 214 dictates the motion of the hot piston 264 and the second cam groove 221 on the surface 215 of the support 213 dictates the motion of the cold piston 266. The particular shapes of the cam grooves 220 and 221 can be determined as described previously.

For either of the engine assemblies 100 and 200, the torque transfer disks that are used may be implemented with an additional offset radial mass, that is selected to balance the hot and cold pistons used in those engine assemblies to prevent excess vibration. This is possible due to the rotating parts that are used in the engine assemblies 100 and 200 which can be modified if needed.

In alternative embodiments, both of the engine assemblies 100 and 200 may be used with the cam lobes shown in FIGS. 6A and 6B. However, the cam lobes shown in FIGS. 6A and 6B can only be used to drive a piston where torque transfer is not required.

Figure 31:
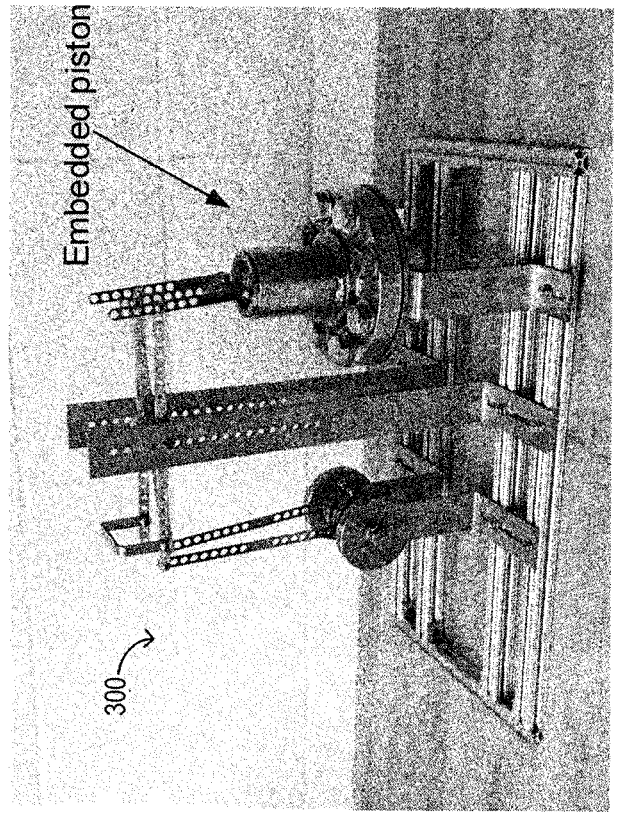
FIG. 31 is an image of a prototype engine that uses an embedded piston arrangement in accordance with the teachings herein.

Referring now to FIG. 31, shown therein is an image of a prototype engine 300 that uses an embedded piston arrangement in accordance with the teachings herein. The prototype engine 300 has demonstrated the feasibility of the embedded piston arrangement.

The inventors have also conducted a study into continuous harmonic sinusoidal Stirling engines which demonstrated that for a 500 W engine with a heat source at 500° C., the sinusoidal configuration is only capable of obtaining a maximum efficiency of 34% whereas the theoretical Carnot efficiency is 61%. This indicates the compelling advantage of following a non-continuous cycle, in accordance with the teachings herein, in which, even though there may be a minor increase in friction losses, there is a potential gain of 27% in absolute efficiency (from 34% to 61%) from more closely following the thermodynamic cycle using non-circular cam profiles.

The inventors note that even a small increase in efficiency is important since, for example, in many microgeneration applications the engines run regularly so that even a small improvement in efficiency can be extremely valuable. Thus, the relatively low cost of the technology described herein (per kwh), the high efficiencies, and the fuel independence makes this a potentially competitively disruptive technology in the microscale heat and power market.

It should be understood that the engine assemblies shown in FIGS. 15-30 will include additional components as is known to those skilled in the art that are needed for the proper operation of an engine such as, but not limited to, bearings for pivot points (e.g. needle rollers, sealed and non-sealed ball bearings, and/or sliding bearings), gaskets for mating structural metallic components, as well as tubing, fins and plates for heat acceptor and expulsion components. Steel, stainless steel, aluminum, copper, titanium, and surface treatments may be used for the dynamic and static components as needed. The engine will also be a sealed individual unit composed of the pistons, regenerator (optional), cam, connecting rods, starter mechanism, power output shaft, and heat input/burner unit. These additional components are not shown for ease of illustration and in order to focus on the structural and operational characteristics of the drive and power mechanisms.

The burner unit for an engine that incorporates at least one of the non-circular cam profiles and the embedded piston arrangements described herein will be capable of burning a wide range of inputs including wood and biomass, and also fuels such as butane and propane. Such an engine may also include a connection port for a solar thermal concentrator input. Accordingly, to power the engine, the user can select from a wide range of fuels or heat inputs based on what is available.

Applications for the engines described herein are vast and include at least one of producing electrical power by connecting to a generator, powering pumps (e.g. for wells, agriculture, or small business needs), and operating small machinery (e.g. threshers and other small farm equipment). Future engine models may also include multiple units of embedded piston arrangement so the engine can be scaled up in multiples of a certain horsepower per unit. Users can then select from a range of engines with a power output specific to each application.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A drive mechanism for an external heat engine, comprising:
    a support having an axis of rotation and a cam that is disposed about the axis of rotation and has a non-circular shape to generate non-sinusoidal motion of a piston that is coupled to the drive mechanism so that the piston is adapted to move in a prescribed non-sinusoidal manner to dwell for a portion of a cycle;
    an output shaft rotatably coupled to the axis of rotation; and
    a cam follower slidingly engageable with the cam and connectable to a drive input, the cam follower travelling in a non-sinusoidal manner due to the cam having a non-circular shape,
wherein an angular velocity of rotation for the output shaft is based on the cam follower moving about the cam.

2. The drive mechanism of claim 1, wherein the cam comprises a cam lobe that is rotatably coupled to the support, the cam lobe having a non-circular surface that is slidably engaged by the cam follower.

3. The drive mechanism of claim 2, wherein the cam follower is an end portion of a connecting rod that is movable in a single degree of freedom and the cam lobe is coupled to the piston to drive the piston during use.

4. The drive mechanism of claim 1, wherein the cam comprises a cam groove that is formed on a first surface of the support and the cam follower comprises a journal bearing pin that engages and slides within the cam groove during use.

5. The drive mechanism of claim 4, wherein the drive mechanism further comprises a torque transfer disk that is adjacent to the surface of the support having the cam groove and rotatably coupled to the cam groove, and the torque transfer disk comprises a torque transfer disk groove that is engaged by the journal bearing pin of the cam follower, and the torque transfer disk and the output shaft are rotatably coupled and rotate together during use.

6. The drive mechanism of claim 5, wherein the torque transfer disk groove has a first end that is disposed from the axis of rotation by a first amount equal to a minimum distance of the cam groove to the axis of rotation and a second end that is disposed from the axis of rotation by a second amount equal to a maximum distance of the cam groove from the axis of rotation.

7. The drive mechanism of claim 1, wherein the drive mechanism comprises:
    a second support having a second axis of rotation that is coaxial with the axis of rotation of the support;
    a second cam having a second cam profile or groove on a second surface of the second support; and
    a second cam follower comprising a second journal bearing pin that engages and slides within the second cam profile or groove during use.

8. The drive mechanism of claim 7, wherein the drive mechanism comprises a second torque transfer disk that is adjacent to the second surface of the second support having the second cam profile or groove and rotatably coupled to the second cam, and the second torque transfer disk comprises a second torque transfer disk groove that is engaged by the second journal bearing pin of the second cam follower.

9. The drive mechanism of claim 1, wherein the drive mechanism comprises:
    a second cam having a second cam profile or groove on a second surface of the support that is opposite to the first surface; and
    a second cam follower comprising a second journal bearing pin that engages and slides within the second cam profile or groove during use.

10. The drive mechanism of claim 9, wherein the drive mechanism comprises a second torque transfer disk that is adjacent to the second surface of the support having the second cam profile or groove and rotatably coupled to the second cam, and the second torque transfer disk comprises a second torque transfer disk groove that is engaged by the second journal bearing pin of the second cam follower.

11. A power mechanism comprising:
    a cylinder having a closed end wall and an open end;
    a first piston being at least partially disposed within the cylinder, the first piston having an end wall with an aperture that is proximal to the closed end wall of the cylinder and an open end that extends past the open end of the cylinder, the first piston being movable with respect to the cylinder;
    a second piston being disposed within the first piston and being movable therein, the second piston having a closed end wall that is proximal to the end wall of the first piston and the first piston acting as a cylinder for the second piston; and
    a shared working fluid that is disposed between the closed end wall of the cylinder and the closed end wall of the second piston;
wherein, during use, at least one of the first and second pistons move causing the working fluid to transition between an end wall of the cylinder where the working fluid receives heat input from a heating source and expands and the end wall of the second piston vessel where the working fluid provides heat output to an external cooling source and contracts, thereby providing a net work output.

12. The power mechanism of claim 11, wherein the power mechanism further comprises a regenerator that is disposed at the aperture of the end wall of the first piston and is adapted for cooling the working fluid when the working fluid moves from the cylinder to the second piston and the regenerator is adapted for heating the working fluid when the working fluid moves from the second piston to the cylinder.

13. The power mechanism of claim 12, wherein the regenerator comprises a porous medium, a random network of wire fibers, a wire mesh, or any passageway that enables heat transfer when the working fluid passes therethrough.

14. The power mechanism of claim 11, wherein the first and second pistons are moveable according to a desired thermodynamic cycle.

15. The power mechanism of claim 14, wherein during a phase of the thermodynamic cycle the first piston moves and the second piston is stationary.

16. The power mechanism of claim 14, wherein during another phase of the thermodynamic cycle the second piston moves and the first piston is stationary.

17. The power mechanism of claim 14, wherein during another phase of the thermodynamic cycle both the first and second pistons move.

18. The power mechanism of claim 14, wherein the first and second pistons move according to a non-sinusoidal motion during the thermodynamic cycle.

19. The power mechanism of claim 11, wherein the second piston has a heat transfer surface capable of thermal communication with the external cooling source.

20. The power mechanism of claim 19, wherein the heat transfer surface comprises an annular cylindrical chamber extending from the closed end wall of the second piston and for receiving a coolant that is capable of being cooled by the external cooling source.

21. The power mechanism of claim 19, wherein the heat transfer surface comprises an external surface of an end wall of the second piston and/or an external circumferential surface of the second piston that extends past the open end wall of the first piston wherein the heat transfer surface is capable of being cooled by the external cooling source.

22. An engine assembly comprising:
- a drive mechanism comprising:
  - a support having an axis of rotation and a cam that is disposed about the axis of rotation and has a non-circular shape to generate non-sinusoidal motion of a piston that is coupled to the drive mechanism so that the piston is adapted to move in a prescribed non-sinusoidal manner to dwell for a portion of a cycle;
  - an output shaft rotatably coupled to the axis of rotation; and
  - a cam follower slidingly engageable with the cam and connectable to a drive input, the cam follower travelling in a non-sinusoidal manner due to the cam having a non-circular shape,
  - wherein an angular velocity of rotation for the output shaft is based on the cam follower moving about the cam;
- a power mechanism comprising:
  - a cylinder having a closed end wall and an open end;
  - a first piston being at least partially disposed within the cylinder, the first piston having an end wall with an aperture that is proximal to the closed end wall of the cylinder and an open end that extends past the open end of the cylinder, the first piston being movable with respect to the cylinder;
  - a second piston being disposed within the first piston and being movable therein, the second piston having a closed end wall that is proximal to the end wall of the first piston and the first piston acting as a cylinder for the second piston; and
  - a shared working fluid that is disposed between the closed end wall of the cylinder and the closed end wall of the second piston; wherein, during use, at least one of the first and second pistons move causing the working fluid to transition between an end wall of the cylinder where the working fluid receives heat input from a heating source and expands and the end wall of the second piston vessel where the working fluid provides heat output to an external cooling source and contracts, thereby providing a net work output;
- a first connecting rod for coupling the first piston of the power mechanism to the cam groove of the drive mechanism; and
- a second connecting rod for coupling the second piston of the power mechanism to the second cam groove of the drive mechanism.

* * * * *